United States Patent
Kiyohara et al.

(10) Patent No.: US 9,721,169 B2
(45) Date of Patent: Aug. 1, 2017

(54) IMAGE PROCESSING DEVICE FOR DETECTING VEHICLE IN CONSIDERATION OF SUN POSITION

(71) Applicants: Clarion Co., Ltd., Saitama-shi, Saitama (JP); Nissan Motor Co., Ltd., Yokohama-shi, Kanagawa (JP)

(72) Inventors: Masahiro Kiyohara, Tokyo (JP); Katsuyuki Nakamura, Tokyo (JP); Masayuki Takemura, Tokyo (JP); Kota Irie, Sagamihara (JP); Yasuhisa Hayakawa, Yokohama (JP); Osamu Fukata, Yokohama (JP)

(73) Assignees: Clarion Co., Ltd., Saitama-shi (JP); Nissan Motor Co., Ltd., Yokohama-shi (JP)

( * ) Notice: Subject to any disclaimer, the term of this patent is extended or adjusted under 35 U.S.C. 154(b) by 241 days.

(21) Appl. No.: 14/417,650

(22) PCT Filed: Jul. 22, 2013

(86) PCT No.: PCT/JP2013/069785
§ 371 (c)(1),
(2) Date: Jan. 27, 2015

(87) PCT Pub. No.: WO2014/017434
PCT Pub. Date: Jan. 30, 2014

(65) Prior Publication Data
US 2015/0220793 A1    Aug. 6, 2015

(30) Foreign Application Priority Data
Jul. 27, 2012    (JP) ................................ 2012-167602

(51) Int. Cl.
*G06K 9/00*    (2006.01)
*G06K 9/46*    (2006.01)
(Continued)

(52) U.S. Cl.
CPC ..... *G06K 9/00791* (2013.01); *G06K 9/00805* (2013.01); *G06K 9/4642* (2013.01);
(Continued)

(58) Field of Classification Search
None
See application file for complete search history.

(56) References Cited

U.S. PATENT DOCUMENTS 8,560,179 B2 * 10/2013 Basir .................... B60N 2/002
382/181
2010/0253489 A1 * 10/2010 Cui ....................... G01S 13/723
340/425.5
(Continued)

FOREIGN PATENT DOCUMENTS

JP    2003-255430 A    9/2003
JP    2005-73296 A    3/2005
(Continued)

OTHER PUBLICATIONS

F. Rattei, et al., "Shadow-based Vehicle Model Refinement and Tracking in Advanced Automotive Driver ASsistance Systems," 9th IEEE Symposium on Embedded Systems for Real-Time Multimedia (ESTIMedia), 2011.*
(Continued)

*Primary Examiner* — Matthew Bella
*Assistant Examiner* — Soo Shin
(74) *Attorney, Agent, or Firm* — Crowell & Moring LLP

(57) ABSTRACT

An image processing device includes: an image acquisition unit that obtains a photographic image of an area outside of a vehicle captured and output by a camera; a sun decision unit that calculates a sun position which indicates, at least, a solar elevation and makes a decision as to whether or not the solar elevation is equal to or lower than a predetermined elevation; an opacity detection unit that detects clouding of
(Continued)

a lens surface of the camera; a vehicle detection unit that detects another vehicle, different from the vehicle, based upon image information of a first image area in the photographic image; and a control unit that suspends detection of the other vehicle by the vehicle detection unit if the opacity detection unit detects opacity in, at least, the first image area and the sun decision unit decides that the solar elevation is equal to or lower than the predetermined elevation.

11 Claims, 33 Drawing Sheets

(51) Int. Cl.
  *H04N 5/225* (2006.01)
  *G08G 1/16* (2006.01)
  *H04N 7/18* (2006.01)
(52) U.S. Cl.
  CPC ........... *G06K 9/4661* (2013.01); *G08G 1/166* (2013.01); *G08G 1/167* (2013.01); *H04N 5/2252* (2013.01); *H04N 7/183* (2013.01); *H04N 7/18* (2013.01)

(56) References Cited

U.S. PATENT DOCUMENTS

| | | | |
|---|---|---|---|
| 2010/0253540 A1 | 10/2010 | Seder et al. | |
| 2011/0096165 A1* | 4/2011 | Zeng | B60J 3/0204 348/148 |
| 2011/0310245 A1 | 12/2011 | Tsuchiya et al. | |
| 2013/0027511 A1* | 1/2013 | Takemura | G06K 9/00805 348/42 |
| 2013/0338881 A1* | 12/2013 | Sato | G01S 11/14 701/45 |
| 2014/0147007 A1 | 5/2014 | Hayakawa et al. | |

FOREIGN PATENT DOCUMENTS

| | | |
|---|---|---|
| JP | 2010-86266 A | 4/2010 |
| JP | 2012-3662 A | 1/2012 |
| JP | 2012-118929 A | 6/2012 |
| WO | WO 2013/018673 A1 | 2/2013 |

OTHER PUBLICATIONS

International Search Report dated Sep. 10, 2013 with English translation (four (4) pages).
H. Shih-Shinh et al., "On-board vision system for lane recognition and front-vehicle detection to enhance driver's awareness," Proceedings of the 2004 International Conference on Robotics and Automation, Apr. 26, 2004, pp. 2456-2461, vol. 3, Piscataway, New Jersey, XP 010768487.
L. Chin-Teng et al., "Construction of Fisheye Lens Inverse Perspective Mapping Model and Its Applications of Obstacle Detection," Eurasip Journal on Advances in Signal Processing, Jan. 1, 2010, pp. 1-23, vol. 1, No. 3, Hindawi Publishing Corporation, XP 055183209.
Extended European Search Report issued in counterpart European Application No. 13822724.4 dated Sep. 20, 2016 (nine (9) pages).

* cited by examiner

FIG.17

| No. | SUN DECISION UNIT | OPACITY DETECTION UNIT | ROAD SURFACE REFLECTION | FIRST THRESHOLD VALUE $\alpha$ |
|---|---|---|---|---|
| 1 | NOT PRESENT | NOT DETECTED | NOT REFLECTED | LEVEL 4 |
| 2 | NOT PRESENT | NOT DETECTED | REFLECTED | LEVEL 5 |
| 3 | NOT PRESENT | DETECTED | NOT REFLECTED | LEVEL 3 |
| 4 | NOT PRESENT | DETECTED | REFLECTED | LEVEL 4 |
| 5 | PRESENT | NOT DETECTED | NOT REFLECTED | LEVEL 3 |
| 6 | PRESENT | NOT DETECTED | REFLECTED | LEVEL 2 |
| 7 | PRESENT | DETECTED | NOT REFLECTED | LEVEL 10 |
| 8 | PRESENT | DETECTED | REFLECTED | LEVEL 10 |

FIG.23
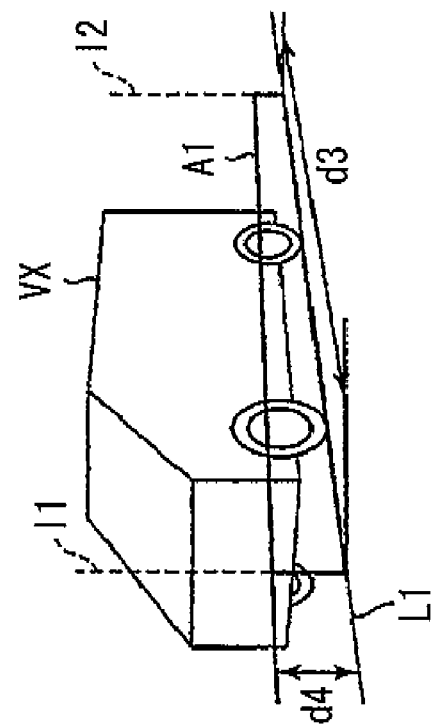
(b)
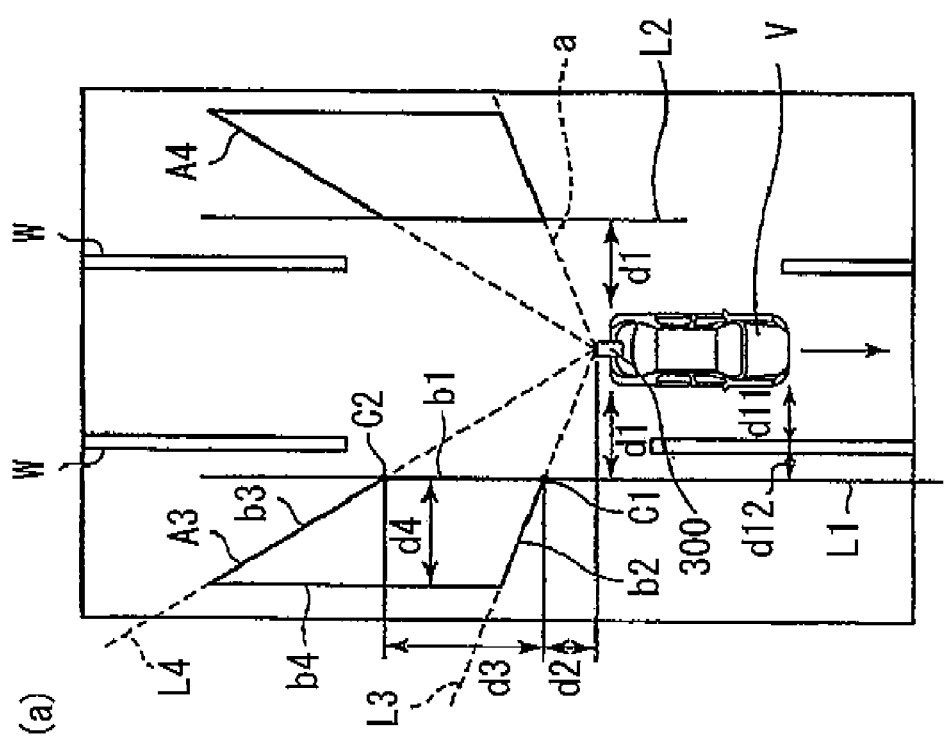
(a)

FIG.24
(a) 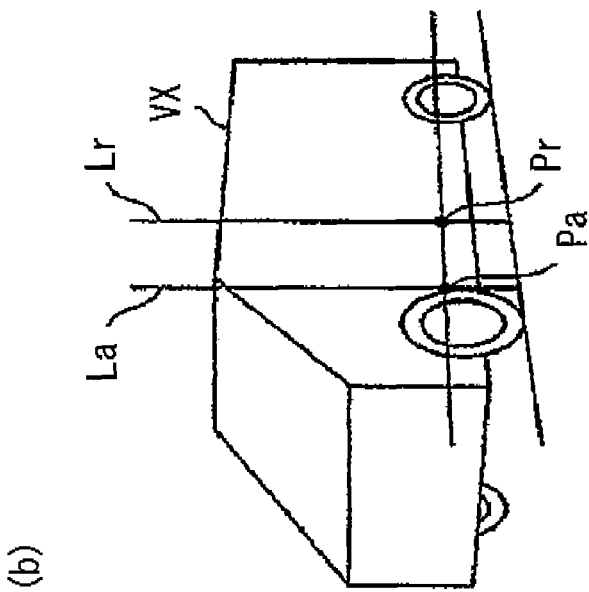
(b) 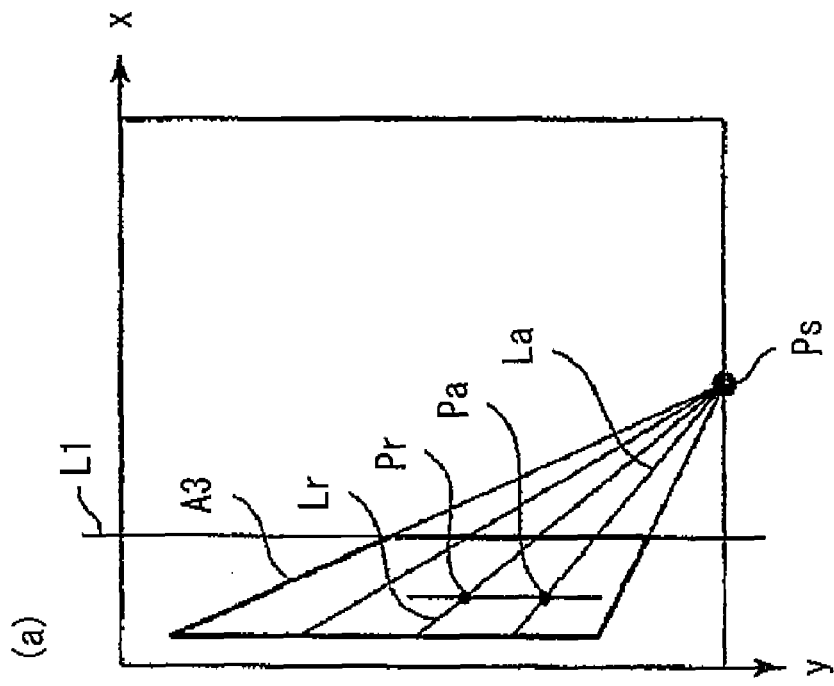

FIG.32

| No. | SECOND SUN DECISION UNIT | OPACITY DETECTION UNIT | THRESHOLD VALUE $\theta$ |
|---|---|---|---|
| 9 | NOT PRESENT | NOT DETECTED | LEVEL 5 |
| 10 | NOT PRESENT | DETECTED | LEVEL 4 |
| 11 | PRESENT | NOT DETECTED | LEVEL 2 |
| 12 | PRESENT | DETECTED | LEVEL 10 |

IMAGE PROCESSING DEVICE FOR DETECTING VEHICLE IN CONSIDERATION OF SUN POSITION

TECHNICAL FIELD

The present invention relates to an image processing device.

BACKGROUND ART

There is a technology known in the related art whereby an image of an area around a vehicle is photographed via an onboard imaging device and the position of a light source, such as the sun or a headlight of another vehicle, is estimated based upon the photographic image. For instance, patent literature 1 discloses an image processing device for a vehicle capable of estimating a change in the luminance of the light source via a luminance-change amount estimation means.

CITATION LIST

Patent Literature

Patent literature 1: Japanese Laid Open Patent Publication No. 2010-086266

SUMMARY OF INVENTION

Technical Problem

There is an issue that needs to be effectively addressed in the related art in that the accuracy of image recognition processing, executed to detect, for instance, a vehicle in the vicinity, is bound to be lowered if sunlight enters a clouded lens.

Solution to Problem

An image processing device according to a first aspect of the present invention comprises: an image acquisition unit that obtains a photographic image of an area outside of a vehicle captured and output by a camera; a sun decision unit that calculates a sun position which indicates, at least, a solar elevation and makes a decision as to whether or not the solar elevation is equal to or lower than a predetermined elevation; an opacity detection unit that detects clouding of a lens surface of the camera; a vehicle detection unit that detects another vehicle, different from the vehicle, based upon image information of a first image area in the photographic image; and a control unit that suspends detection of the other vehicle by the vehicle detection unit if the opacity detection unit detects opacity in, at least, the first image area and the sun decision unit decides that the solar elevation is equal to or lower than the predetermined elevation.

According to a second aspect of the present invention, in the image processing device according to the first aspect, it is preferable that the vehicle detection unit has a predetermined threshold value pertaining to detection sensitivity with which the other vehicle is detected; and if clouding manifests at the lens surface over a range corresponding to an image range centered on the sun position, the control unit adjusts the threshold value so as to lower the detection sensitivity for detection of the other vehicle relative to the detection sensitivity set when no clouding manifests over said range at the lens surface.

According to a third aspect of the present invention, in the image processing device according to the first aspect, it is preferable that the sun decision unit calculates the sun position based upon a date/time, a latitude and a longitude of a position taken by the vehicle and an orientation of the vehicle.

According to a fourth aspect of the present invention, in the image processing device according to the first aspect, it is preferable that the sun decision unit calculates the sun position by executing image processing on the photographic image.

According to a fifth aspect of the present invention, in the image processing device according to the fourth aspect, it is preferable that the camera captures an image of at least a road surface outside the vehicle; and the sun decision unit extracts a high luminance area formed due to road surface reflection from the photographic image and calculates the sun position based upon a position of a gravitational center of the high luminance area.

According to a sixth aspect of the present invention, in the image processing device according to the second aspect, it is preferable that the control unit detects clouding at the lens surface over the range corresponding to the image range centered on the sun position based upon a luminance gradient in said image range.

According to a seventh aspect of the present invention, in the image processing device according to the first aspect, an opacity detection area is set in the photographic image; and the opacity detection unit calculates a histogram of edge intensity for the opacity detection area and detects an area where clouding manifests at the camera lens based upon an average value of the edge intensity calculated by using the histogram.

According to an eighth aspect of the present invention, in the image processing device according to the seventh aspect, the camera captures an image of at least a road surface outside the vehicle; a plurality of opacity detection areas are set near a vanishing point of a white line painted on the road surface; and the opacity detection unit calculates histograms of edge intensity, each in correspondence to one of the opacity detection areas, and detects an area where clouding manifests at the camera lens based upon average values of the edge intensity each calculated by using one of the histograms.

According to a ninth aspect of the present invention, in the image processing device according to the seventh aspect, the camera captures an image of at least a road surface outside the vehicle; the opacity detection area includes a first opacity detection area set near a vanishing point of a white line painted on the road surface at a position further upward relative to a center of the photographic image and a second opacity detection area set near the vanishing point so as to range further downward relative to the first opacity detection area; and the opacity detection unit detects an area where clouding manifests at the camera lens by using the first opacity detection area during daytime and detects an area where clouding manifests at the camera lens by using the second opacity detection area during nighttime.

According to a tenth aspect of the present invention, in the image processing device according to any one of the first to ninth aspects, it is preferable to further comprise: a notification control unit that engages a specific notification unit to report that detection of the other vehicle by the vehicle detection unit has been suspended by the control unit.

According to an eleventh aspect of the present invention, in the image processing device according to the second aspect, it is preferable that the opacity detection unit detects clouding at the lens surface of the camera when a degree of opacity at the lens surface of the camera exceeds a first opacity degree; the vehicle detection unit sets the threshold value to a first threshold value when the degree of opacity at the lens surface of the camera is a second opacity degree at which no clouding manifests at the lens surface; the vehicle detection unit sets the threshold value to a second threshold value greater than the first threshold value when the degree of opacity at the lens surface of the camera exceeds the first opacity degree; and the vehicle detection unit sets a third opacity degree, in correspondence to which the threshold value is set to a third threshold value smaller than both the first threshold value and the second threshold value, between the second opacity degree and the first opacity degree.

Advantageous Effect of the Invention

According to the present invention, image recognition processing can be executed with high accuracy even when sunlight enters the photographic image.

DESCRIPTION OF EMBODIMENTS

First Embodiment

Figure 1:
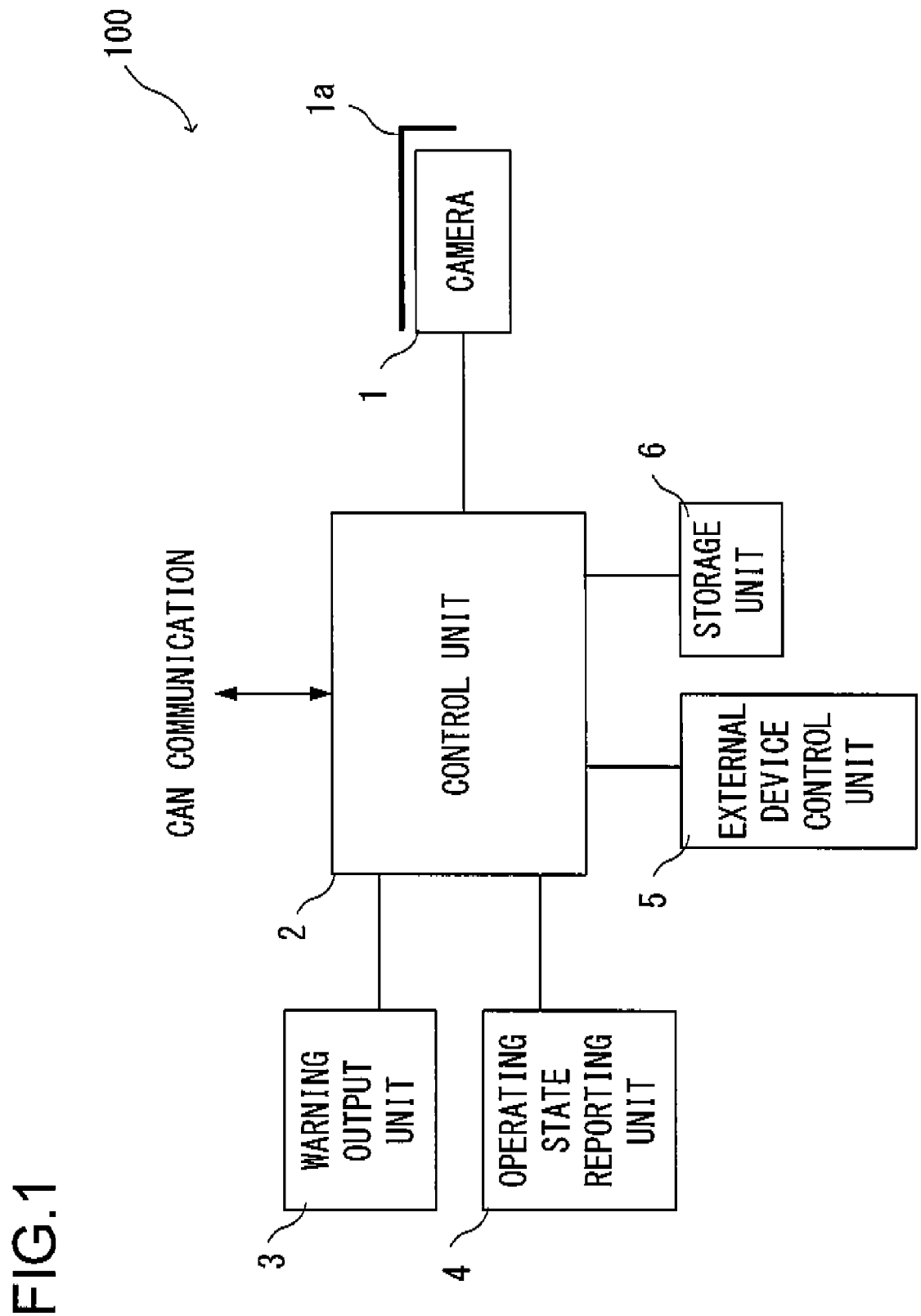
FIG. 1 A block diagram showing the configuration of an onboard vehicle recognition device achieved in a first embodiment of the present invention FIG. 2 An illustration of a photographic field and a shielded area pertaining to a camera FIG. 3 An example of a mounting position at which the camera may be installed FIG. 4 A block diagram showing various functional units included in a control unit so as to enable the control unit to fulfill the BSW function at the onboard vehicle recognition device achieved in the first embodiment of the present invention FIG. 5 Schematic illustrations of the processing executed by an alignment unit, with (a) showing the vehicle in a traveling state in a plan view and (b) showing images representing the essential concept of alignment FIG. 6 A plan view showing the vehicle in a traveling state FIG. 7 A schematic illustration showing how a differential waveform may be generated by a three-dimensional object detection unit FIG. 8 Sub-ranges defined by the three-dimensional object detection unit FIG. 9 An example of a histogram that may be generated by the three-dimensional object detection unit FIG. 10 An illustration showing how weights may be applied by the three-dimensional object detection unit FIG. 11 A flowchart pertaining to a vehicle detection unit FIG. 12 A flowchart pertaining to the vehicle detection unit FIG. 13 Examples of opacity detection areas set by an opacity detection unit FIG. 14 A flowchart pertaining to the opacity detection unit FIG. 15 An illustration showing the position of the sun calculated by a sun decision unit and a sun range set by the sun decision unit FIG. 16 A flowchart pertaining to the sun decision unit FIG. 17 An example of a table related to value settings for the first threshold value α set by a BSW control unit FIG. 18 A schematic illustration of the essential concept of decision-making executed by the BSW control unit to decide whether or not light is reflected off the road surface FIG. 19 A flowchart pertaining to the BSW control unit FIG. 20 A flowchart pertaining to a warning control unit FIG. 21 A block diagram showing the configuration of an onboard vehicle recognition device achieved in a second embodiment of the present invention FIG. 22 A block diagram showing various functional units included in the control unit so as to enable the control unit to fulfill the BSW function at the onboard vehicle recognition device achieved in the second embodiment of the present invention FIG. 23 Illustrations of the subject vehicle in a traveling state, with (a) showing the positional relationships among detection areas and the like in a plan view and (b) showing the positional relationships among the detection areas and the like assumed in real space FIG. 24 Illustrations in reference to which the operation executed by a luminance calculation unit is to be explained, with (a) showing the positional relationships among a subject line, a reference line, a subject point and a reference point in a bird's-eye view image and (b) showing the positional relationships among the subject line, the reference line, the subject point and the reference point in real space FIG. 25 Detailed illustrations in reference to which the operation executed by the luminance calculation unit is to be explained, with (a) showing a detection area in a bird's-eye view image and (b) showing the positional relationships among the subject line, the reference line, the subject points and the reference points in a bird's-eye view image FIG. 26 Illustrations each showing an edge line and the luminance distribution on the edge line, with (a) showing the luminance distribution manifesting when a three-dimensional object (vehicle) is present in the detection area and (b) showing the luminance distribution manifesting when no three-dimensional object is present in the detection area FIG. 27 A flowchart pertaining to a second vehicle detection unit FIG. 28 A flowchart pertaining to the second vehicle detection unit FIG. 29 A flowchart pertaining to a second sun decision unit FIG. 30 A schematic illustration of the arithmetic operation executed by the second sun decision unit to calculate the position of the sun FIG. 31 A flowchart pertaining to a second BSW control unit FIG. 32 An example of a table related to value settings for the threshold value θ set by the second BSW control unit FIG. 33 A diagram showing the relationship between the degree of opacity and the level of the threshold value

FIG. 1 is a block diagram of an on-board vehicle recognition device 100 achieved in an embodiment of the present invention. The on-board vehicle recognition device 100 in FIG. 1, which is installed at a vehicle, comprises a camera 1 with a light shielding plate 1a mounted thereat, a control unit 2, a warning output unit 3, an operating state reporting unit 4, an external device control unit 5 and a storage unit 6.

The camera 1, disposed so as to face toward the space behind the vehicle, captures images within a photographic field that includes the road surface stretching behind the vehicle over predetermined time intervals. The camera 1 includes an image sensor such as a CCD sensor or a CMOS sensor. The photographic images obtained via the camera 1 are each output from the camera 1 to the control unit 2.

Figure 2:
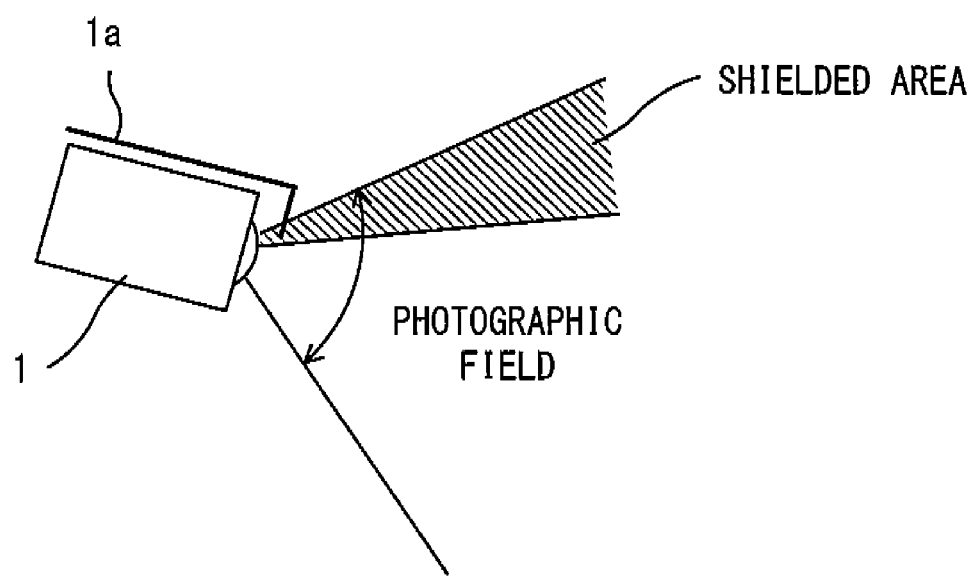

The light shielding plate 1a is mounted at the camera 1 so as to block part of the light advancing toward a photographic lens in the camera 1. FIG. 2 shows a side view of the photographic field and the shielded area with regard to the camera 1. As FIG. 2 shows, part of the upper side of the photographic field of the camera 1 is masked with the light shielding plate 1a, thereby forming a shielded area. The camera 1 captures an image, which includes the road surface behind the vehicle, in the photographic field excluding the shielded area. The photographic field (the angle of view) is set over a relatively wide range so as to allow the camera 1 to capture an image of the road surface behind the vehicle in a sufficiently wide range along the left/right direction. This means that unwanted light originating from sources other than the road surface, such as the sky and the background, in the photographic field will also enter the camera 1. Accordingly, the shielded area is created via the light shielding plate 1a so that entry of such unwanted light at the camera 1 is blocked.

Figure 3:
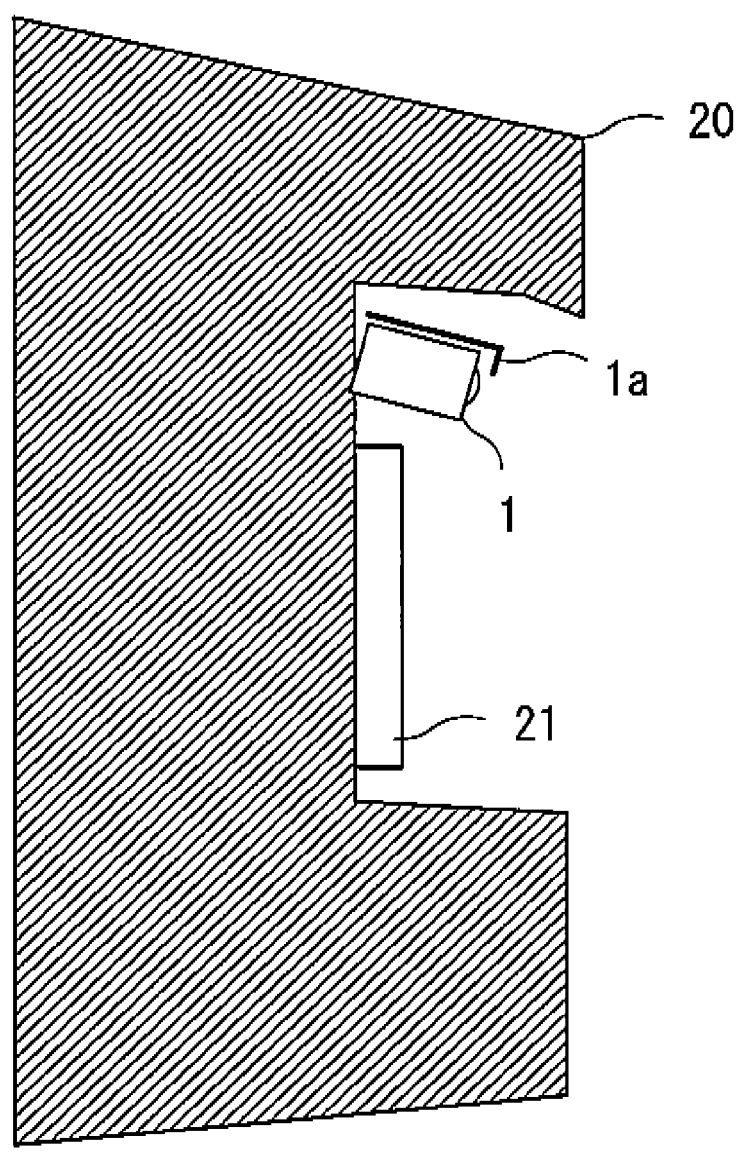

FIG. 3 presents an example of a mounting position at which the camera 1 may be installed. A number plate 21 is mounted at a body 20 at the rear of the subject vehicle. The camera 1 is mounted so as to face downward diagonally from a position directly above the number plate 21, with the light shielding plate 1a mounted above the camera 1. It is to be noted that the mounting position in this figure simply represents an example and the camera 1 may be mounted at another position. The mounting position for the camera 1 may be determined freely, as long as an image of the road surface behind the vehicle can be captured over an optimal range.

The control unit 2 executes a specific type of image processing on a photographic image output from the camera 1 by executing a program stored in the storage unit 6 and then executes various types of control based upon the processing results. Under the control executed by the control unit 2, various functions such as the LDW (lane departure warning) function, the BSW (blind spot warning) function, the MOD (moving object detection) function, the PED (pedestrian detection) function, the RSR (road sign recognition) function and the IMD (image diagnosis) function are achieved in the on-board vehicle recognition device 100. Through the LDW function, a white line on the road surface (such as a traffic lane line or a lane edge) is detected and a warning is output if the subject vehicle appears to be about to depart the current lane. Through the MOD function, a moving object is detected in the photographic image so as to alert the driver to the presence of any moving object around the subject vehicle as it is, for instance, reversing. Through the PED function, a human shape is detected in the photographic image so as to alert the driver to the presence of a pedestrian in the path on which the subject vehicle is advancing. Through the RSR function, a traffic sign on the road captured in the photographic image is recognized and the driver is given a warning if, for instance, the subject vehicle is traveling at a speed exceeding the speed limit indicated in the sign. Through the IMD function, a diagnosis is executed so as to determine whether or not photographic images are correctly captured via the camera 1. Through the BSW function, another vehicle traveling on the road is detected from the photographic image and the driver is alerted to the presence of a vehicle with any likelihood of colliding with the subject vehicle during a lane change or the like.

The warning output unit 3 outputs warnings to be issued via a warning lamp, an alarm buzzer and the like to the driver of the vehicle. The warning lamp may be installed on, for instance, each of front roof pillars of the vehicle. Operations of the warning output unit 3 are controlled by the control unit 2. A warning is output via the warning output unit 3 under the control executed by the control unit 2 if, for instance, the subject vehicle is determined to be about to depart the current lane through the LDW function or if a vehicle with which the subject vehicle could collide is detected through the BSW function.

The operating state reporting unit 4 reports the operating state of the on-board vehicle recognition device 100 to the driver of the vehicle. For instance, if specific operating conditions are not satisfied and the on-board vehicle recognition device 100 is thus in a non-operating state, the operating state reporting unit 4 issues a warning to the driver by turning on a lamp installed near the driver's seat in the vehicle under control executed by the control unit 2. Through these measures, the driver is warned that the on-board vehicle recognition device 100 is in a non-operating state.

The external device control unit 5 controls an external device under control executed by the control unit 2.

Next, BSW control executed by the control unit 2 in the onboard vehicle recognition device 100 will be described. When an intense light source such as the sun is present within the photographic field of the camera 1, the contrast in the area near the position of the light source in the photographic image is bound to be lower. If the photographic lens at the camera 1 becomes clouded due to a build-up of dirt, the contrast will be further lowered over the entire photographic image. The accuracy with which another vehicle or the like is detected through the BSW function in a photographic image will be greatly diminished when the contrast is lowered over the entire image. When the sun is present within the photographic field, the control unit 2 controls the BSW operation based upon the position and the degree of clouding at the lens surface of the photographic lens in the camera 1.

Figure 4:
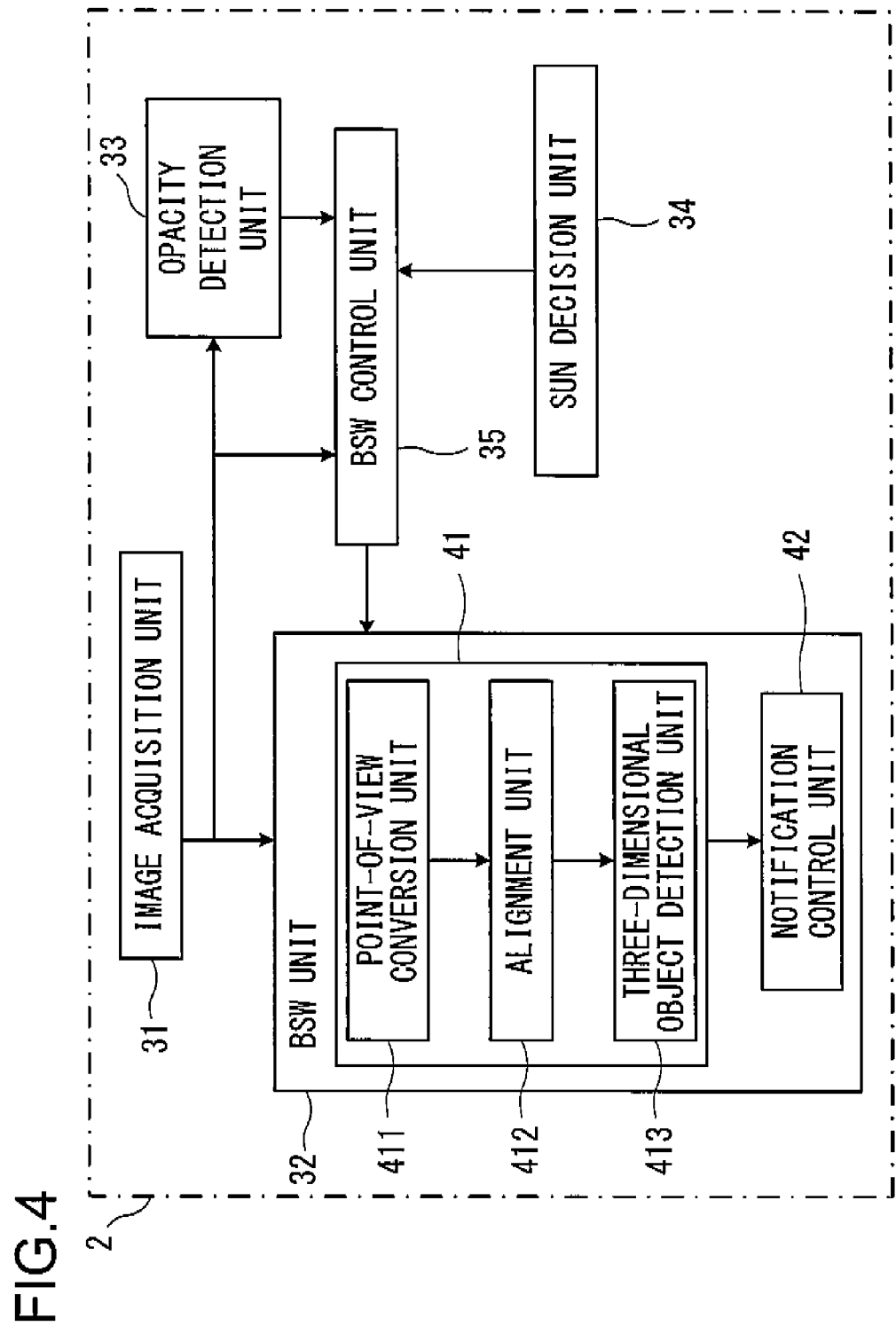

FIG. 4 is a control block diagram pertaining to the BSW-related control executed by the control unit 2. As FIG. 4 illustrates, the control unit 2 includes an image acquisition unit 31, a BSW unit 32, an opacity detection unit 33, a sun decision unit 34 and a BSW control unit 35.

(Image Acquisition Unit 31)

The image acquisition unit 31 obtains image information for photographic images output from the camera 1 over predetermined time intervals. The photographic image information of each photographic image obtained by the image acquisition unit 31, is output to, at least, the BSW unit 32 and the opacity detection unit 33. In the example presented in FIG. 4, the image acquisition unit 31 also outputs the photographic image information to the BSW control unit 35.

(BSW Unit 32)

The BSW unit 32 includes a vehicle detection unit 41 and a notification control unit 42. The vehicle detection unit 41, in turn, includes a point-of-view conversion unit 411, an alignment unit 412 and a three-dimensional object detection unit 413.

(Point-of-View Conversion Unit 411)

The point-of-view conversion unit 411 executes point-of-view conversion on the photographic image information obtained by the image acquisition unit 31 so as to convert the photographic image information to bird's-eye view image data expressing a bird's-eye view image. A bird's-eye view image is an image viewed from the point-of-view of a virtual camera set above the vehicle so as to look straight down. This point-of-view conversion may be executed as disclosed in, for instance, Japanese Laid Open Patent Publication No.

2008-219063. The photographic image data are converted to bird's-eye view image data through the point-of-view conversion so as to distinguish a flat object from a three-dimensional object based upon the principle of the point-of-view conversion whereby vertical edges unique to a three-dimensional object are converted to a group of straight lines passing through a specific fixed point through the point-of-view conversion executed to convert photographic image data to bird's-eye view image data.

(Alignment Unit 412)

Figure 5:
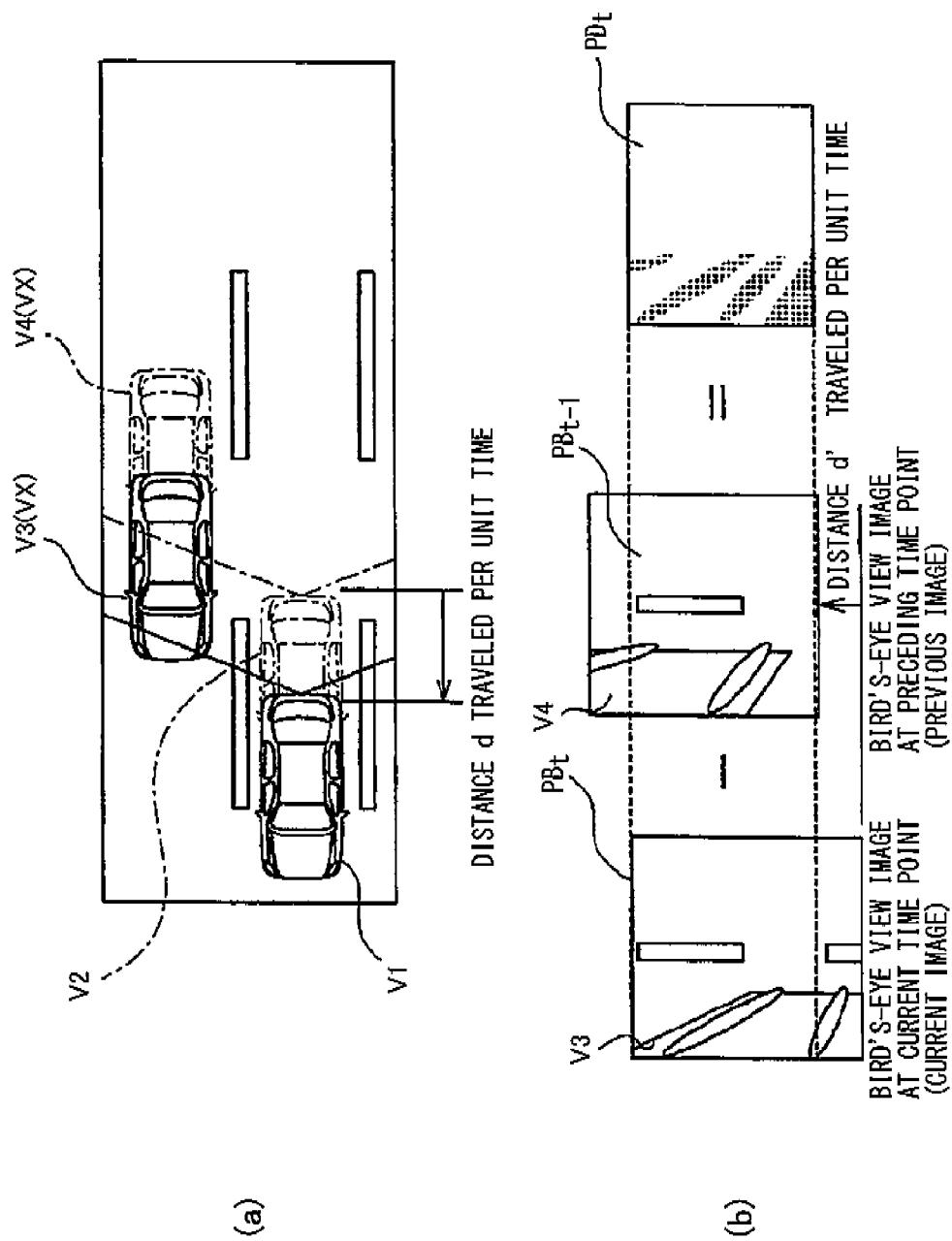

The alignment unit 412, to which sets of bird's-eye view data resulting from the point-of-view conversion at the point-of-view conversion unit 411 are sequentially input, aligns the positions of the bird's-eye view image data input thereto at different time points. FIG. 5 illustrates the essential concept of the processing executed by the alignment unit 412, with FIG. 5(a) showing the subject vehicle V in a traveling state and FIG. 5(b) showing images representing the essential concept of alignment.

As shown in FIG. 5(a), the subject vehicle V, at a position V1 at the current time point, was traveling at a position V2 at a previous time point. In addition, another vehicle VX in a position to the rear of the subject vehicle V is traveling in the lane next to the lane in which the subject vehicle V is traveling. The current position of the other vehicle VX is V3, and the other vehicle VX was traveling at a position V4 at the previous time point. In addition, the subject vehicle V has traveled a distance d over a single time unit elapsing between the two time points. It is to be noted that the term "previous time point" may refer to a time point in the past before the current time point by a predetermined time length (e.g., by a single control cycle) or it may refer to a previous time point before the current time point by any time length.

Under these conditions, a bird's-eye view image $PB_t$ is generated at the current time point, as shown in FIG. 5(b). In the bird's-eye view image $PB_t$, the white lines on the road take on a rectangular shape as they would in a relatively accurate plan view. However, skewing manifests with regard to the other vehicle VX at the position V3. In a bird's-eye view image $PB_{t-1}$ generated at the previous time point, too, the white lines on the road take on a rectangular shape as they would in a relatively accurate plan view but a skew manifests with regard to the other vehicle VX at the position V4. This phenomenon may be explained as follows; while vertical edges of a three-dimensional object (including edges rising from the road surface in three-dimensional space, as well as vertical edges in the strict sense) are converted to a group of straight lines extending along the skewing direction through the point-of-view conversion processing executed to convert the photographic image data to bird's-eye view image data, such skewing does not occur as a result of the point-of-view conversion of a flat image on the road surface that does not include any vertical edges.

The alignment unit 412 executes alignment of the bird's-eye view images $PB_t$ and $PB_{t-1}$ on the data. During the alignment operation, the alignment unit 412 offsets the bird's-eye view image $PB_{t-1}$ generated at the previous time point so as to align its position with that of the bird's-eye view image $PB_t$ generated at the current time point. The image on the left side and the image at the center in FIG. 5(b) are offset by a displacement distance d'. This offset quantity d' represents the extent of displacement in the bird's-eye view image data, which corresponds to the actual displacement distance d having been covered by the subject vehicle V, as shown in FIG. 5(a). The offset quantity d' is determined based upon a signal output from a vehicle speed sensor and the length of time having elapsed between the previous time point and the current time point.

In addition, following the alignment, the alignment unit 412 generates data expressing a differential image $PD_t$ by taking the difference between the bird's-eye view images $PB_t$ and $PB_{t-1}$. The pixel values indicated by the pixels in the differential image $PD_t$ may indicate the absolute values of the values representing the differences between the pixel values in the bird's-eye view image $PB_t$ and the corresponding pixel values in the bird's-eye view image $PB_{t-1}$, or they may indicate "1" when the absolute values exceed a predetermined threshold value p and indicate "0" when they do not exceed the threshold value p, so as to adapt to a change in the illuminance environment. The image on the right side in FIG. 5(b) is the differential image $PD_t$. The threshold value p may be selected in advance.

(Three-Dimensional Object Detection Unit 413)

The three-dimensional object detection unit 413 in FIG. 4 detects a three-dimensional object based upon the data expressing the differential image $PD_t$ shown in FIG. 5(b). Three-dimensional objects detected by the three-dimensional object detection unit 413 include another vehicle that may come into contact with the subject vehicle V as it changes lanes. The three-dimensional object detection unit 413 also calculates the displacement distance covered by the three-dimensional object in real space. The three-dimensional object detection unit 413 uses the displacement distance covered by the three-dimensional object per unit time in the calculation of the traveling speed of the three-dimensional object. The three-dimensional object detection unit 413 then makes a decision as to whether or not the three-dimensional object is a vehicle based upon the traveling speed of the three-dimensional object.

Figure 6:
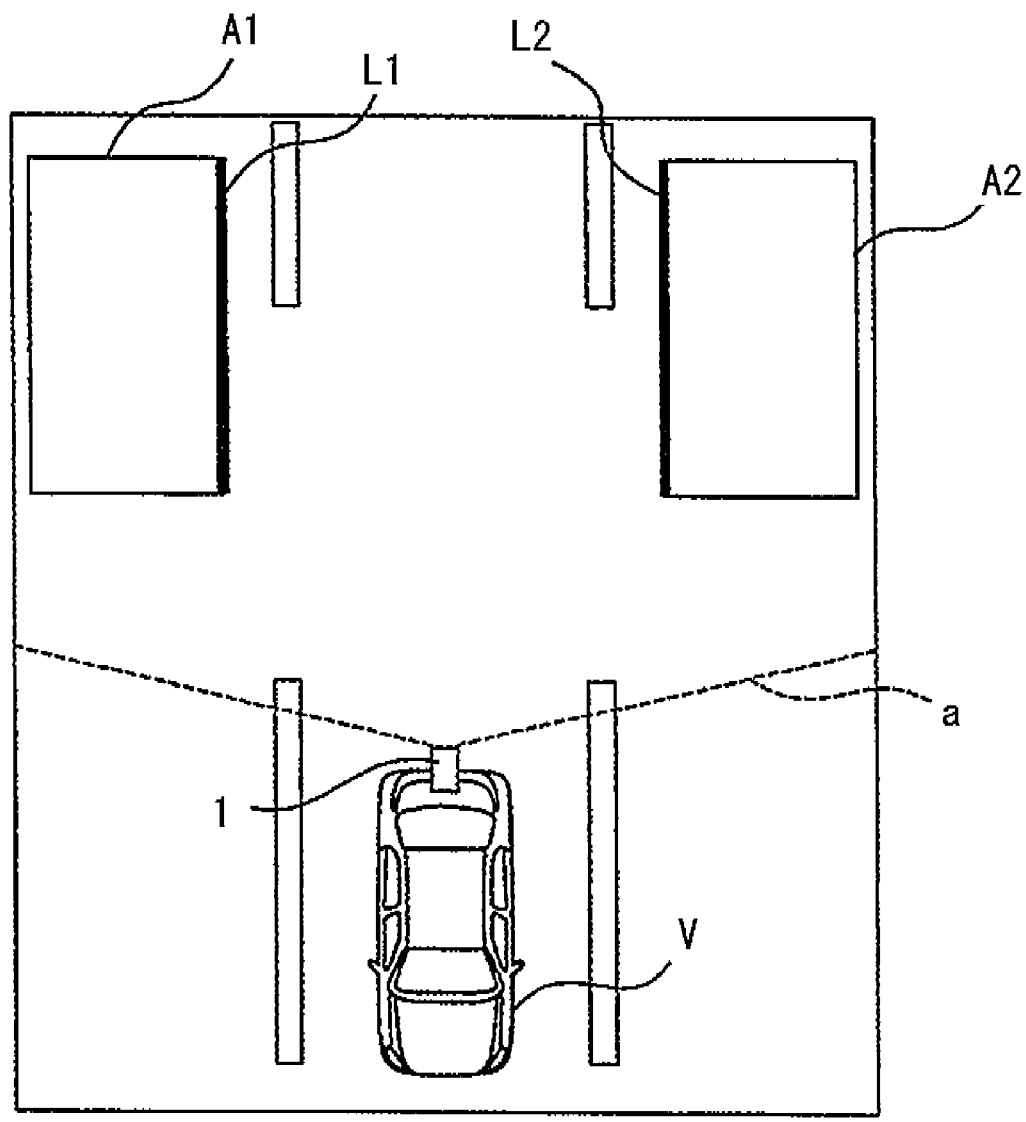

The three-dimensional object detection unit 413 first generates a differential waveform. The three-dimensional object detection unit 413 generating the differential waveform sets detection areas in the differential image $PD_t$. FIG. 6 presents examples of detection areas. FIG. 6 shows rectangular detection areas A1 and A2 set on the left side and the right side to the rear of the subject vehicle V. Another vehicle present in the detection area A1 or A2 in FIG. 6 is detected as a three-dimensional object in a lane adjacent to the lane in which the subject vehicle V is traveling.

In the example presented in FIG. 6, the detection areas A1 and A2 are set in the lanes on the left side and on the right side, both adjacent to the lane in which the subject vehicle V is traveling. The three-dimensional object detection unit 413 may set such detection areas A1 and A2 relative to the position of the subject vehicle V, or it may set the detection areas A1 and A2 in reference to the positions of white lines by adopting existing white line recognition technology or the like.

In addition, the three-dimensional object detection unit 413 recognizes the sides of the detection areas A1 and A2 having been set, which are located toward the subject vehicle V (the sides extending along the traveling direction) as grounding lines L1 and L2. While the term "grounding line" is normally used to refer to a line through which a three-dimensional object comes into contact with the ground, the term is not used in the description of the embodiment to refer to a line contacting the ground but is used as described above. It is to be noted that through experience, it has been confirmed that the difference between a grounding line as set in the embodiment and a normal grounding line determined based upon the position of the other vehicle VX never becomes too large, and thus no problem arises in practical use.

Figure 7:
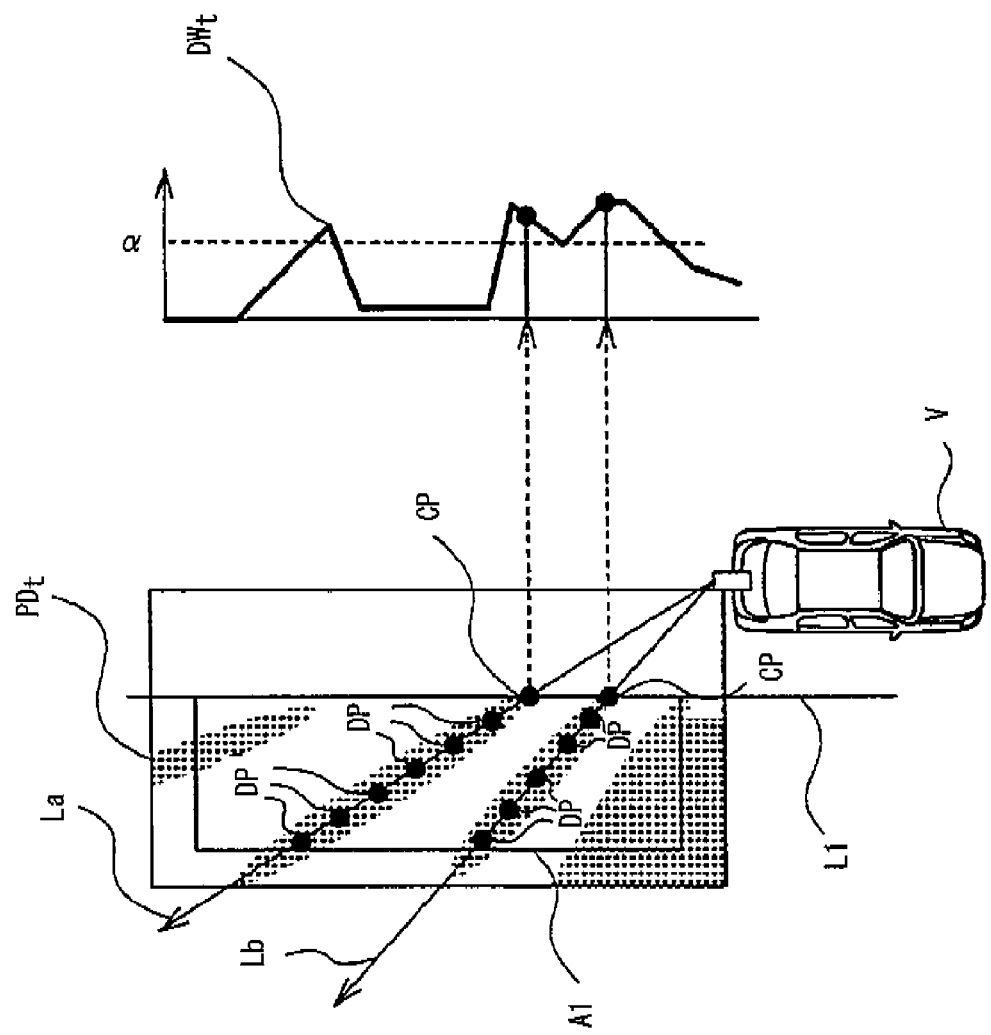

FIG. 7 schematically illustrates how the differential waveform is generated by the three-dimensional object detection unit 413. As FIG. 7 shows, the three-dimensional object detection unit 413 generates differential waveforms $DW_t$ based upon the part of the differential image $PD_t$ (such as that shown on the right side in FIG. 5(*b*)) generated through the calculation executed by the alignment unit 412, which corresponds to the detection areas A1 and A2. During this process, the three-dimensional object detection unit 413 generates each differential waveform $DW_t$ along the direction in which a three-dimensional object becomes skewed through the point-of-view conversion. It is to be noted that while an explanation is given in reference to FIG. 7 for the differential waveform $DW_t$ corresponding to the detection area A1 alone for simplification, a differential waveform $DW_t$ is also generated through a similar procedure for the detection area A2.

The three-dimensional object detection unit 413 defines a line La extending along the direction in which the three-dimensional object is skewed on the data expressing the differential image $PD_t$. The three-dimensional object detection unit 413 then counts the number of differential image pixels DP present on the line La, which indicate a predetermined difference. The differential image pixels DP indicating the predetermined difference, counted by the three-dimensional object detection unit 413, are pixels with values exceeding a predetermined threshold value if the pixel values in the differential image $PD_t$ are the absolute values of the differences between the pixel values in the bird's-eye view image PB1 and the bird's-eye view image $PB_{t-1}$. If the pixels in the differential image $PD_t$ take the pixel value "0" or "1", the differential image pixels DP take the pixel value "1".

After counting the number of differential image pixels DP, the three-dimensional object detection unit 413 determines an intersecting point CP at which the line La and a grounding line (e.g., the grounding line L1) intersect each other. Then, the three-dimensional object detection unit 413 correlates the intersecting point CP with the count value. The three-dimensional object detection unit 413 determines, based upon the position of the intersecting point CP, the position along the horizontal axis, i.e., along the axis running up/down direction on the right side in FIG. 7 and determines, based upon the count value, the corresponding position along the vertical axis, i.e., along the axis running left/right on the right side in FIG. 7 so as to plot the position as the counted value corresponding to the intersecting point CP.

Subsequently, the three-dimensional object detection unit 413 likewise defines lines Lb, Lc, . . . extending along the skewing direction of the three-dimensional object, counts the number of differential image pixels DP, determines the horizontal positions based upon the positions of the corresponding intersecting points CP, determines the vertical positions based upon the count values (indicating the numbers of differential image pixels DP) and plots the positions. The three-dimensional object detection unit 413 generates the differential waveform $DW_t$, as shown on the right side of FIG. 7, by repeating the process described above in sequence and determining the frequency distribution.

It is to be noted that, as indicated on the left side in FIG. 7, the line La and the line Lb, each extending along the skewing direction of the three-dimensional object, run within the detection area A1 over distances different from each other. This means that assuming that the detection area A1 is full of differential image pixels DP, there are more differential image pixels DP on the line La compared to those on the line Lb. Accordingly, the three-dimensional object detection unit 413, determining the vertical positions based upon the count values indicating the numbers of counted differential image pixels DP, normalizes the count values based upon the distances over which the lines La and Lb, each extending in the skewing direction of the three-dimensional object, overlap with the detection area A1. In more specific terms, as indicated on the left side of FIG. 7, there are 6 differential image pixels DP on the line La and 5 differential image pixels DP on the line Lb, and accordingly, the three-dimensional object detection unit 413, determining the vertical positions based upon the count values, as shown in FIG. 7, normalizes the count values by, for instance, dividing each count value by the corresponding overlapping distance. As a result, the values in the differential waveform $DW_t$ corresponding to the lines La and Lb, each extending in the skewing direction of the three-dimensional object, are substantially equal to each other, as indicated in the differential waveform $DW_t$.

Once the differential waveform $DW_t$ is generated, the three-dimensional object detection unit 413 calculates a displacement distance by comparing the differential waveform $DW_t$ with the differential waveform $DW_{t-1}$ generated at the previous time point. In other words, the three-dimensional object detection unit 413 calculates the displacement distance based upon the change having occurred over time, as indicated by the differential waveforms $DW_t$ and $DW_{t-1}$.

Figure 8:
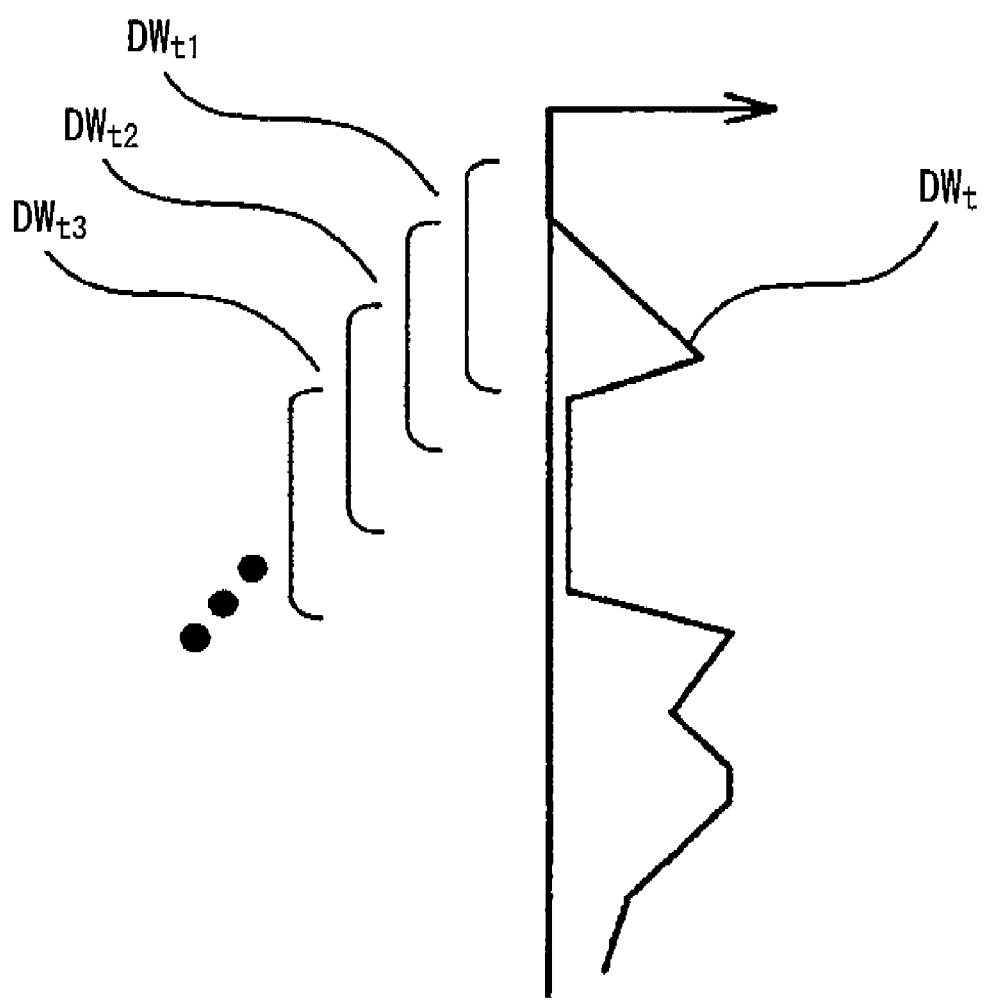

This operation will be described in further detail. The three-dimensional object detection unit 413 first divides the differential waveform $DW_t$ into a plurality of sub-ranges $DW_{t1}$ through $DW_{tn}$ (n is any integer equal to or greater than 2). FIG. 8 shows the sub-ranges $DW_{t1}$ through $DW_{tn}$ of the differential waveform $DW_t$ divided by the three-dimensional object detection unit 413. The three-dimensional object detection unit 413 divides the differential waveform $DW_t$ into the sub-ranges $DW_{t1}$ through $DW_{tn}$ so that they overlap one another, as shown in FIG. 8, for instance. In the example presented in FIG. 8, the sub-range $DW_{t1}$ and the sub-range $DW_{t2}$ overlap each other and the sub-range $DW_{t2}$ and the sub-range $DW_{t3}$ overlap each other.

Next, the three-dimensional object detection unit 413 calculates an offset quantity in correspondence to each of the sub-ranges $DW_{t1}$ through $DW_{tn}$. The term "offset quantity" in this context refers to the extent of displacement occurring in the differential waveform along the horizontal axis (along the up/down direction in FIG. 8), which is calculated based upon the difference between the differential waveform $DW_{t-1}$ generated at the previous time point and the differential waveform $DW_t$ generated at the current time point (based upon the distance along the horizontal axis). More specifically, the three-dimensional object detection unit 413 calculates the offset quantity in correspondence to each of the sub-ranges $DW_{t1}$ through $DW_{tn}$ through the following processing. The three-dimensional object detection unit 413 searches for a position (a position taken along the horizontal axis) at which the error relative to the current differential waveform $DW_t$ is the smallest by shifting the differential waveform $DW_{t-1}$ generated at the previous time point along the horizontal axis in correspondence to each of the sub-ranges $DW_{t1}$ through $DW_{tn}$. Next, the three-dimensional object detection unit 413 calculates the extent of displacement by which the position with the least error is displaced relative to the initial position of the differential waveform $DW_{t-1}$ along the horizontal axis and designates the extent of displacement as the offset quantity.

Figure 9:
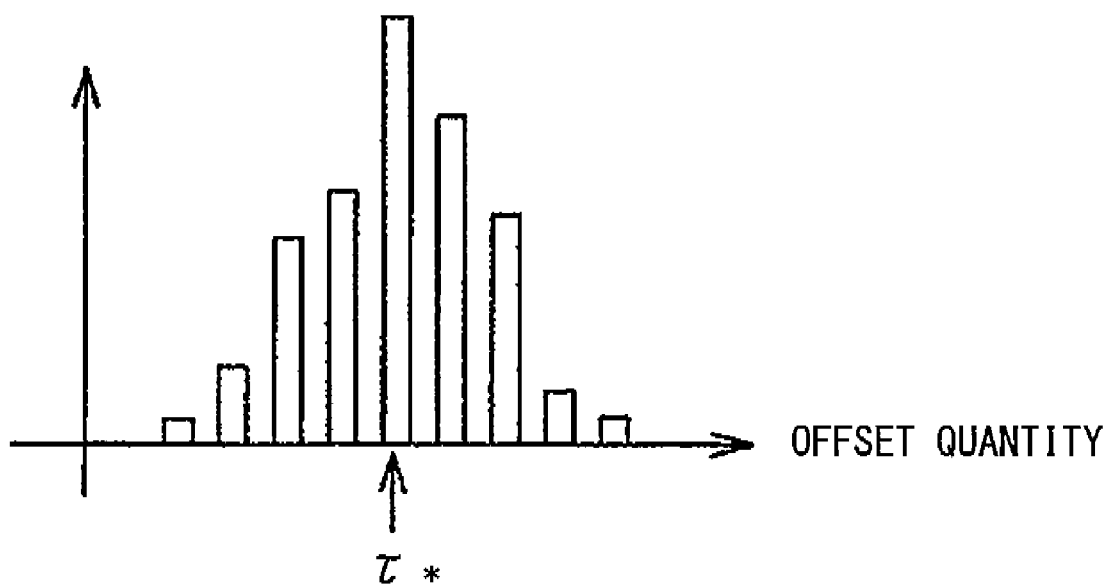

The three-dimensional object detection unit 413 next creates a histogram with the offset quantities each calculated in correspondence to one of the sub-ranges $DW_{t1}$ through $DW_{tn}$ and calculates the displacement distance over which the three-dimensional object has traveled based upon the histogram. FIG. 9 presents an example of an offset quantity histogram. As FIG. 9 indicates, there is bound to be a certain variance among the offset quantities, and accordingly, the three-dimensional object detection unit 413 creates a histogram by using the offset quantities with such a variance and calculates the displacement distance of the three-dimensional object based upon the histogram.

The three-dimensional object detection unit 413 calculates the displacement distance of the three-dimensional object based upon the maximum value indicated in the offset quantity histogram. In the example presented in FIG. 9, the maximum value indicated in the histogram is a displacement distance $\tau^*$. The three-dimensional object detection unit 413 calculates the absolute traveling distance of the three-dimensional object based upon the displacement distance $\tau^*$ and a signal provided from the vehicle speed sensor installed in the subject vehicle V.

Figure 10:
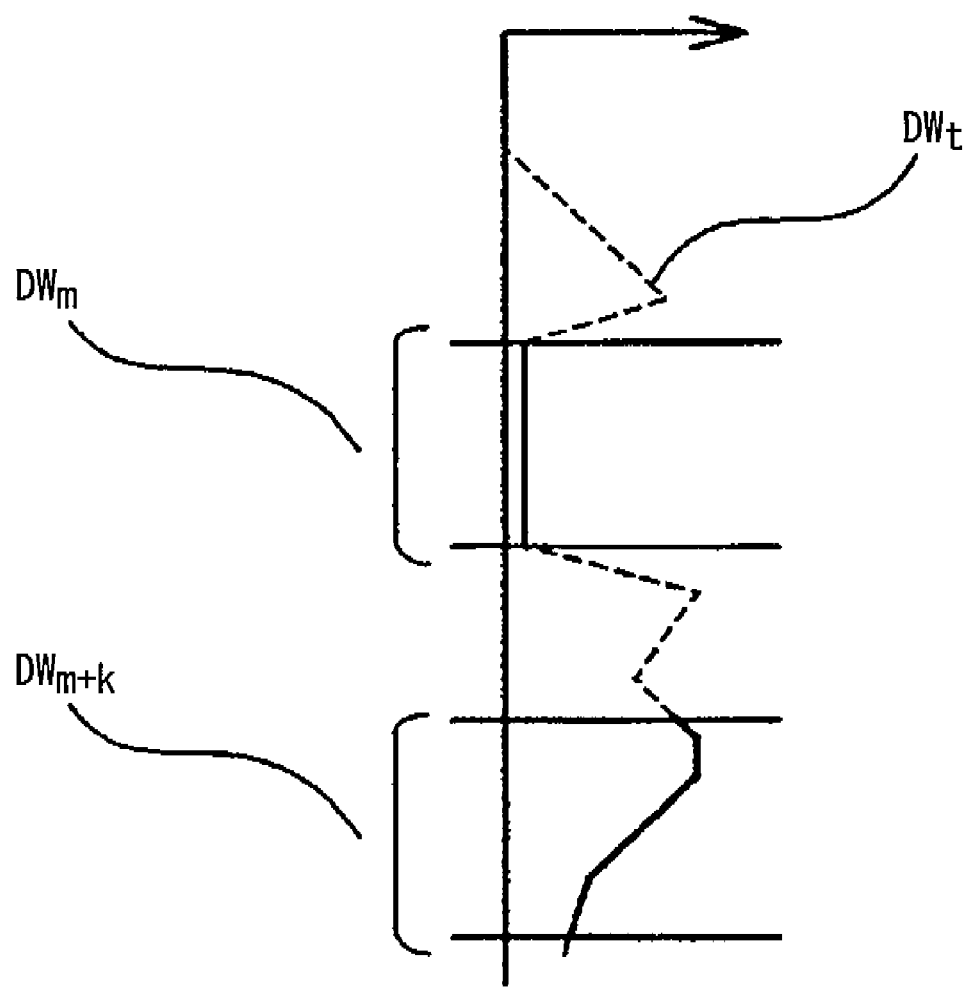

It is to be noted that the three-dimensional object detection unit 413 may create a histogram by weighting each of the plurality of sub-ranges $DW_{t1}$ through $DW_{tn}$ and counting the offset quantities, each having been calculated in correspondence to one of the sub-ranges $DW_{t1}$ through $DW_{tn}$, in correspondence to the applied weights. FIG. 10 shows how weights may be applied by the three-dimensional object detection unit 413.

As FIG. 10 shows, a sub-range $DW_m$ (m is an integer equal to or greater than 1 and equal to or smaller than n−1) is flat range. The three-dimensional object detection unit 413 applies a smaller weight to such a sub-range $DW_{m+k}$, since the error occurring in the offset quantity calculation for a flat sub-range $DW_m$ with no marked characteristics is likely to be significant. In contrast, significant undulation occurs in a sub-range $DW_{m+k}$ (k is an integer equal to or smaller than n−m). The three-dimensional object detection unit 413 applies a large weight to such a sub-range $DW_m$, since the likelihood of accurate offset quantity calculation for the undulating sub-range $DW_{m+k}$ with marked characteristics is high. By applying weighting as described above, the accuracy of three-dimensional object displacement distance calculation can be improved.

(Vehicle Detection Unit 41)

Figure 11:
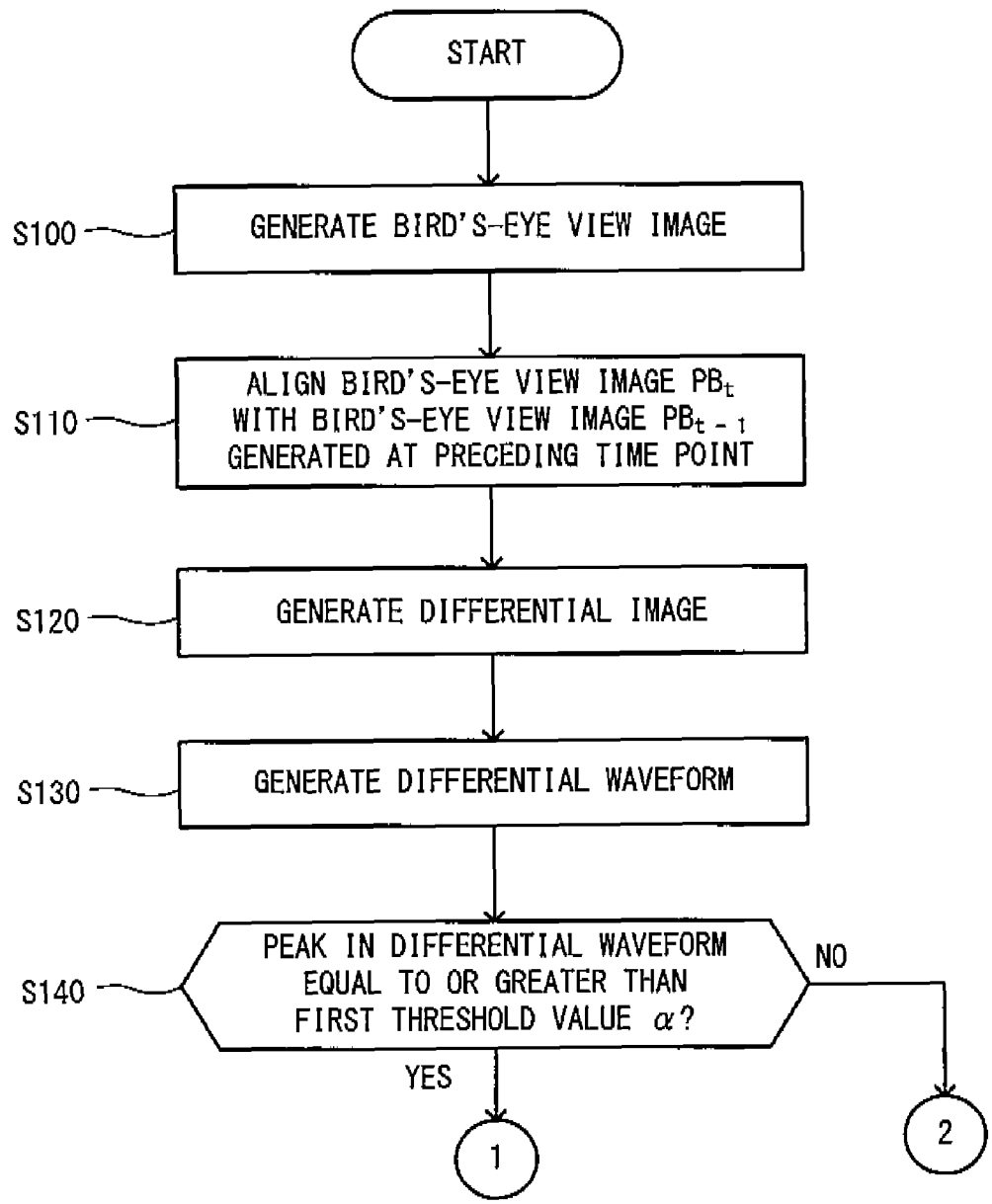
Figure 12:
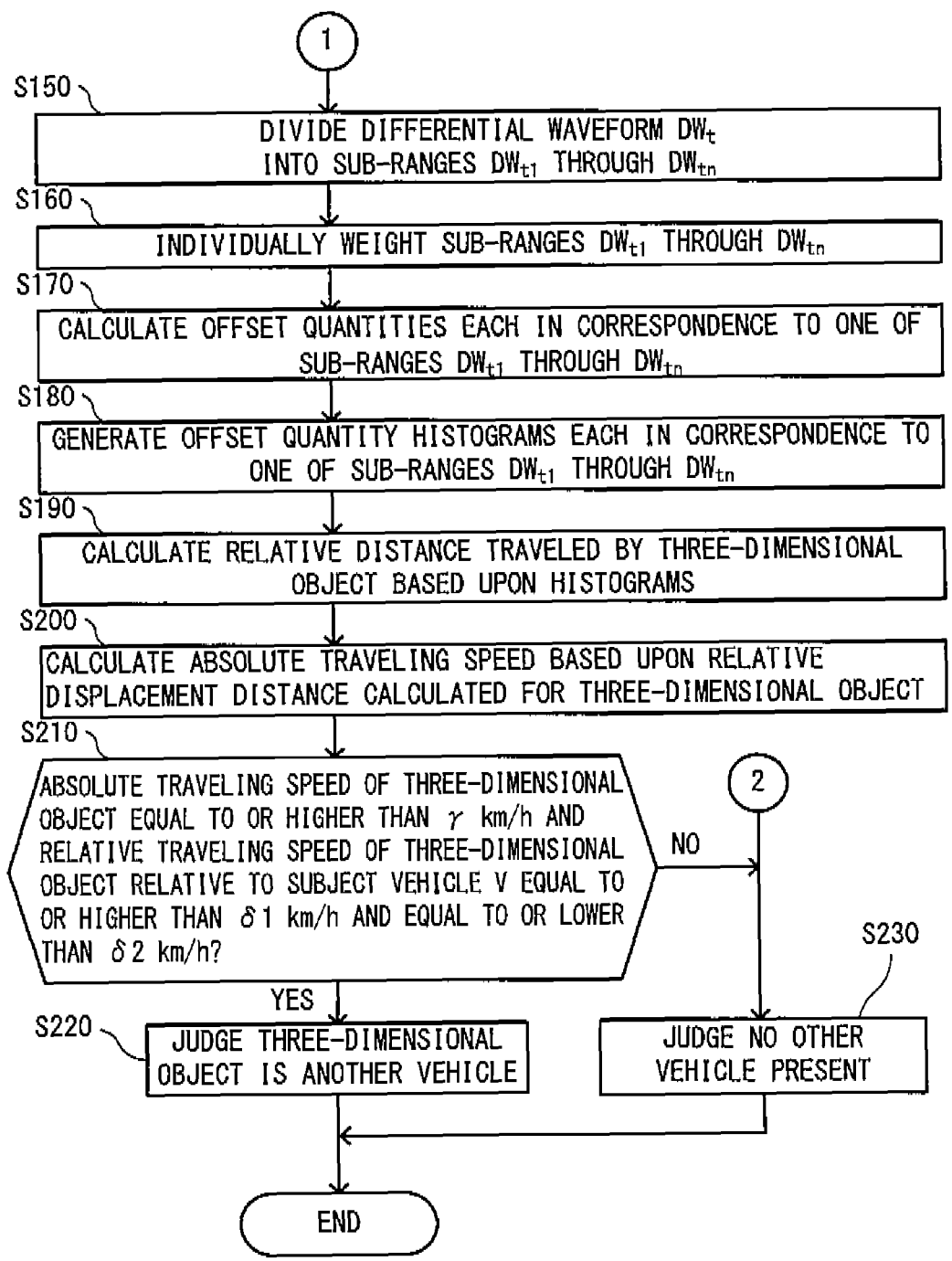

FIG. 11 and FIG. 12 each present a flowchart of the processing pertaining to the vehicle detection unit 41, executed by the control unit 2. In step S100 in FIG. 11, the point-of-view conversion unit 411 generates bird's-eye view image data based upon photographic image information of a photographic image obtained by the image acquisition unit 31. In step S110, the alignment unit 412 aligns the bird's-eye view image $PB_t$ with the bird's-eye view image $PB_{t−1}$ generated at the previous time point. In step S120, the three-dimensional object detection unit 413 generates the differential image $PD_t$. In step S130, the three-dimensional object detection unit 413 generates the differential waveform $DW_t$ based upon the data expressing the differential image $PD_t$ and the data expressing the differential image $PD_{t−1}$ generated at the previous time point.

In step S140, the three-dimensional object detection unit 413 makes a decision as to whether or not the peak in the differential waveform $DW_t$ is equal to or greater than a first threshold value a. This first threshold value $\alpha$ is set under control executed by the BSW control unit 35, which will be described later. The processing in the vehicle detection unit 41 proceeds to step S150 in FIG. 12 upon making an affirmative decision in step S140 but proceeds to step S230 in FIG. 12 upon making a negative decision in step S140.

In step S150 in FIG. 12, the three-dimensional object detection unit 413 divides the differential waveform $DW_t$ into the plurality of sub-ranges $DW_{t1}$ through $DW_{tn}$, as has been explained in reference to FIG. 7. In step S160, the three-dimensional object detection unit 413 applies weights to the sub-ranges $DW_{t1}$ through $DW_{tn}$, as has been explained in reference to FIG. 9. In step S170, the three-dimensional object detection unit 413 calculates the offset quantity in correspondence to each of the sub-ranges $DW_{t1}$ through $DW_{tn}$. In step S180, the three-dimensional object detection unit 413 generates a histogram of the offset quantities each calculated in correspondence to one of the sub-ranges $DW_{t1}$ through $DW_{tn}$. In step S190, the three-dimensional object detection unit 413 calculates a relative displacement distance indicating the distance traveled by the three-dimensional object relative to the subject vehicle V, based upon the histogram created in step S180. In step S200, the three-dimensional object detection unit 413 calculates the absolute traveling speed of the three-dimensional object based upon the relative displacement distance calculated in step S190. The three-dimensional object detection unit 413 calculates the relative traveling speed through time differential operation of the relative displacement distance and then calculates the absolute traveling speed by adding the subject vehicle speed detected via the vehicle speed sensor or the like installed in the subject vehicle.

In step S210, the three-dimensional object detection unit 413 makes a decision as to whether or not the absolute traveling speed of the three-dimensional object is equal to or higher than γ km/h and the relative traveling speed of the three-dimensional object relative to the subject vehicle V is equal to or higher than M km/h and equal to or lower than δ 2 km/h. For instance, the three-dimensional object detection unit 413 makes a decision as to whether or not the absolute traveling speed of the three-dimensional object is equal to or higher than 20 km/h and the relative traveling speed of the three-dimensional object relative to the subject vehicle V is equal to or higher than −20 km/h and equal to or lower than +40 km/h. The processing in the vehicle detection unit 41 proceeds to step S220 upon making an affirmative decision in step S210, but proceeds to step S230 upon making a negative decision in step S210.

In step S220, the three-dimensional object detection unit 413 judges that the three-dimensional object is another vehicle VX. In step S230, the three-dimensional object detection unit 413 judges that no other vehicle is present. The control unit 2 then ends the processing shown in FIG. 11 and FIG. 12.

(Opacity Detection Unit 33)

The opacity detection unit 33 in FIG. 4 detects clouding at the photographic lens in the camera 1. The opacity detection unit 33 sets opacity detection areas in a photographic image captured in the camera 1 and generates an edge intensity histogram for each opacity detection area. The opacity detection unit 33 decides that the photographic lens in the camera 1 is clouded if the average value calculated for the histogram is equal to or smaller than a predetermined value.

Figure 13:
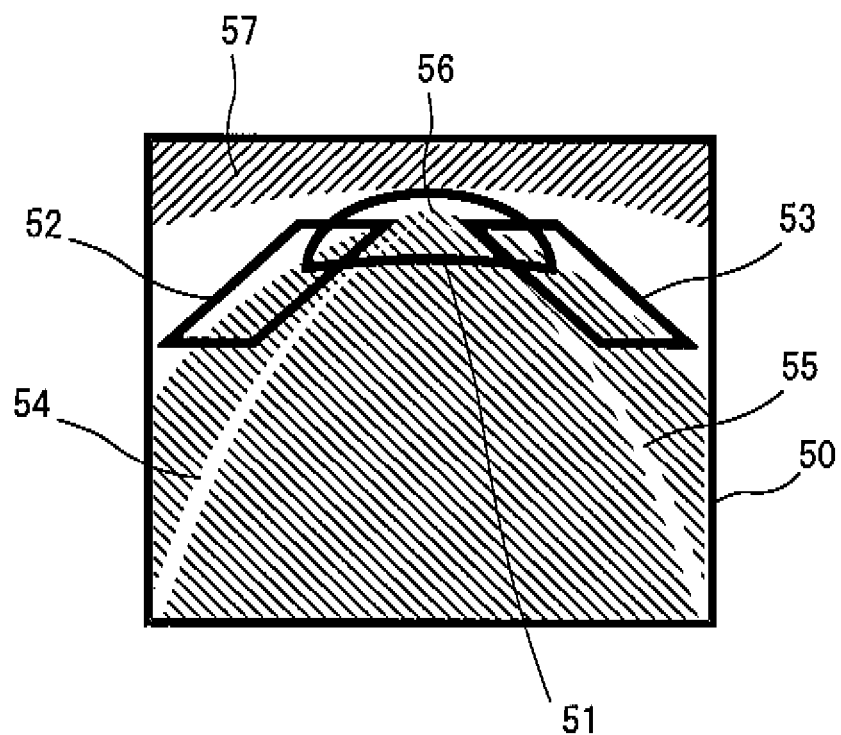

FIG. 13 presents examples of opacity detection areas. FIG. 13 shows opacity detection areas 51, 52 and 53. The opacity detection areas 51, 52 and 53 are set near a vanishing point 56, at which a white line 54 and a white line 55 merge in a photographic image 50.

The opacity detection areas 52 and 53, assuming shapes that achieve left/right symmetry and are set at positions having left/right symmetry with respect to each other. The opacity detection areas 52 and 53 respectively correspond to the detection areas A1 and A2 set by the three-dimensional object detection unit 413, and are used to detect any clouding of the lens surface over areas corresponding to the detection areas A1 and A2. The opacity detection areas 52 and 53 are set at positions located on the two sides of the opacity detection area 51. The opacity detection areas 52 and 53 range over areas lower than the opacity detection area 51, and since any edge near the subject vehicle V can be detected over these ranges, they are suited for nighttime detection of lens surface clouding.

The opacity detection area 51 takes on a shape achieving left/right symmetry, and is set at a position further upward relative to the center of the photographic image but is further downward relative to a shielded area 57. The opacity detection area 51 includes an area that overlaps the opacity detection area 52 and an area that overlaps the opacity detection area 53. The opacity detection area 51 is used to detect clouding of the lens surface over an area corresponding to the detection area A1 set by the three-dimensional object detection unit 413 or clouding of the lens surface over an area corresponding to the detection area A2 set by the three-dimensional object detection unit 413. The image over the opacity detection area 51 manifests relatively little change even when the subject vehicle V is in a traveling state, and for this reason, stable detection accuracy is assured in the opacity detection area 51. It is to be noted that the opacity detection area 51, where an edge present far away from the subject vehicle V can be detected, is suited for daytime detection of lens surface clouding.

By setting opacity detection areas as described above, the opacity detection unit 33 is able to detect clouding of the lens surface of the photographic lens at least over the areas corresponding to the detection areas A1 and A2 set by the three-dimensional object detection unit 413.

Figure 14:
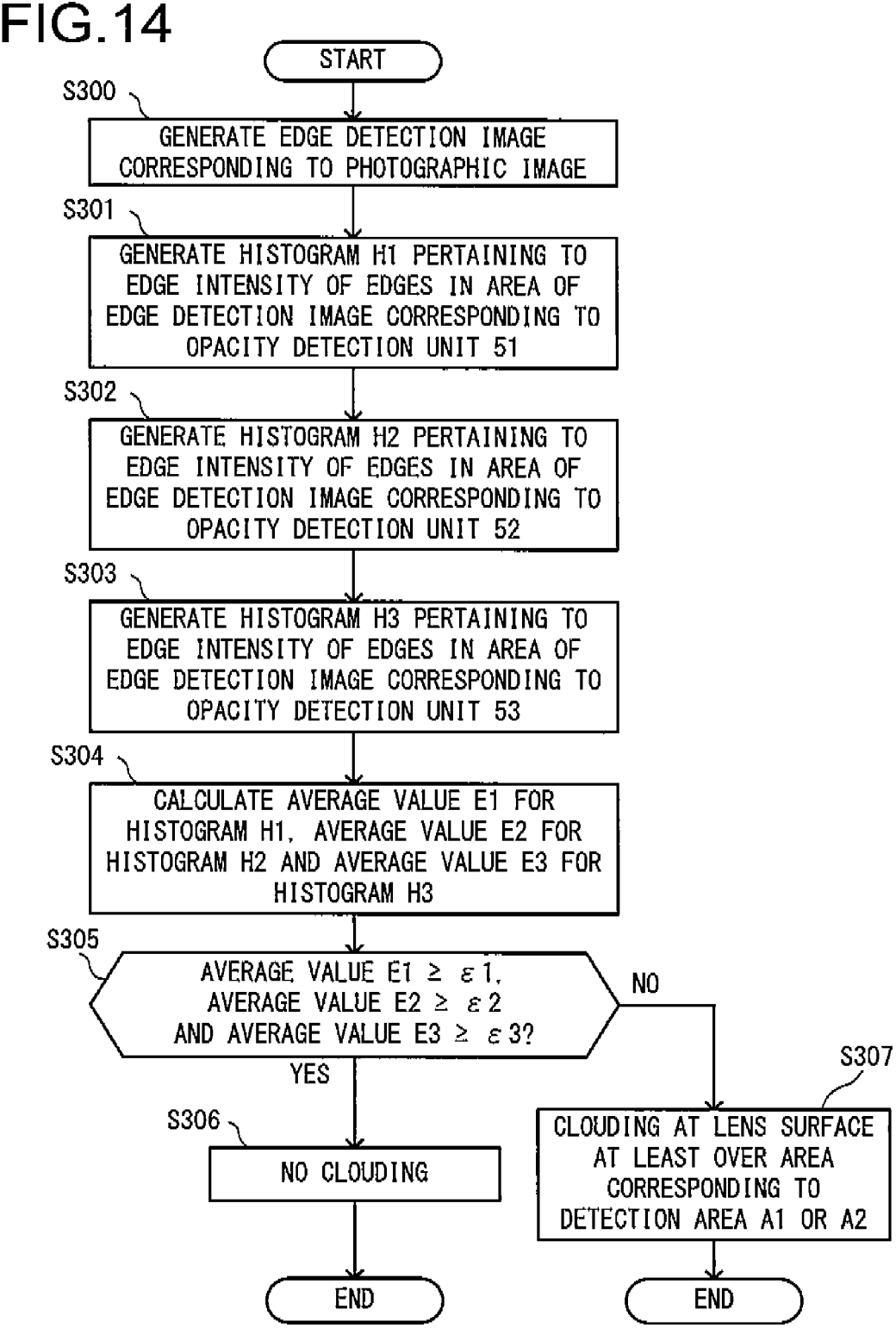

FIG. 14 presents a flowchart of the processing pertaining to the opacity detection unit 33. The photographic image information of a photographic image obtained by the image acquisition unit 31 is input to the opacity detection unit 33. The photographic image information input to the opacity detection unit 33 may express, for instance, the photographic image 50 in FIG. 13. In step S300 in FIG. 14, the control unit 2 generates an edge detection image corresponding to the photographic image through edge detection processing of the known art.

In step S301, the control unit 2 generates a histogram H1 pertaining to the edge intensity of an edge included in an area of the edge detection image having been generated in step S300, which corresponds to the opacity detection area 51. In step S302, the control unit 2 generates a histogram H2 pertaining to the edge intensity of an edge included in an area of the edge detection image having been generated in step S300, which corresponds to the opacity detection area 52. In step S303, the control unit 2 generates a histogram H3 pertaining to the edge intensity of an edge included in an area of the edge detection image having been generated in step S300, which corresponds to the opacity detection area 53. It is to be noted that the processing in step S301, the processing in step S302 and the processing in step S303 may be executed in any order.

In step S304, the control unit 2 calculates an average value E1 for the histogram H1, an average value E2 for the histogram H2 and an average value E3 for the histogram H3. In step S305, the control unit 2 makes a decision as to whether or not the average value E1 is equal to or greater than a predetermined threshold value $\epsilon$ 1, the average value E2 is equal to or greater than a predetermined threshold value $\epsilon$ 2 and the average value E3 is equal to or greater than a predetermined threshold value $\epsilon$ 3. If a negative decision is made in step S305, the control unit 2 proceeds to execute the processing in step S307 in FIG. 14, whereas if an affirmative decision is made in step S305, the control unit 2 proceeds to execute the processing in step S306 in FIG. 14. It is to be noted that the details of the decision making executed in step S305 during daytime opacity detection may be different from those of the decision-making executed in step S304 during nighttime opacity detection. For instance, when opacity detection is executed in daytime, the control unit 2 may simply make a decision as to whether or not the average value E1 is equal to or greater than the predetermined threshold value $\epsilon$ 1. When executing opacity detection during nighttime, the control unit 2 may make a decision as to whether or not the average value E2 is equal to or greater than the predetermined threshold value $\epsilon$ 2 and the average value E3 is equal to or greater than the predetermined threshold value $\epsilon$ 3. Namely, opacity detection may be executed during daytime by using the opacity detection area 51 and may be executed during nighttime by using the opacity detection areas 52 and 53.

In step S306, the control unit 2 determines that the photographic lens in the camera 1 is not clouded. In step S307, the control unit 2 determines that the lens surface of the photographic lens in the camera 1 is clouded at least over an area corresponding to the detection area A1 or the detection area A2.

(Sun Decision Unit 34)

The sun decision unit 34 in FIG. 4 calculates the position of the sun and makes a decision as to whether or not sunlight is entering the photographic field of the camera 1. The position of the sun calculated by the sun decision unit 34 at least indicates the solar elevation (height of the sun above the horizon). The sun decision unit 34 calculates the height of the sun based upon, for instance, date/time information and the latitude of the current position of the subject vehicle V. The sun decision unit 34 further calculates the azimuth of the sun to be used as information pertaining to the solar position. The solar azimuth may be calculated based upon, for instance, the date/time information, the latitude and the longitude of the subject vehicle position and the traveling direction of the subject vehicle.

Figure 15:
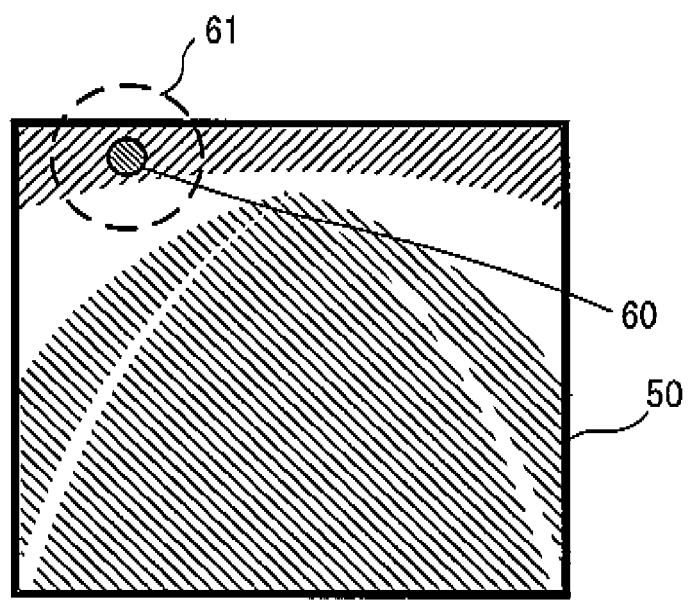

The sun decision unit 34 sets a specific range, centered on a position defined by the solar elevation and solar azimuth having been calculated as a solar range. FIG. 15 illustrates a solar range. FIG. 15 shows a position 60 corresponding to the solar elevation and the solar azimuth calculated by the sun decision unit 34 and an example of a solar range 61 set in correspondence to the position 60 on the photographic image 50.

The sun decision unit 34 makes a decision as to whether or not any part of the solar range overlaps the photographic field. Namely, it makes a decision as to whether or not the solar elevation is equal to or lower than a predetermined elevation and the solar azimuth is within a predetermined range. The predetermined elevation and the predetermined range are set based upon, for instance, the orientation of the body of the subject vehicle V (along the optical axis of the camera 1), the angle of the camera 1 and the like. It is to be noted that the sun decision unit 34 may make a decision as to whether or not any part of the solar range overlaps the photographic field simply by making a decision as to whether or not the solar elevation is equal to or lower than the predetermined elevation without calculating the solar azimuth.

Figure 16:
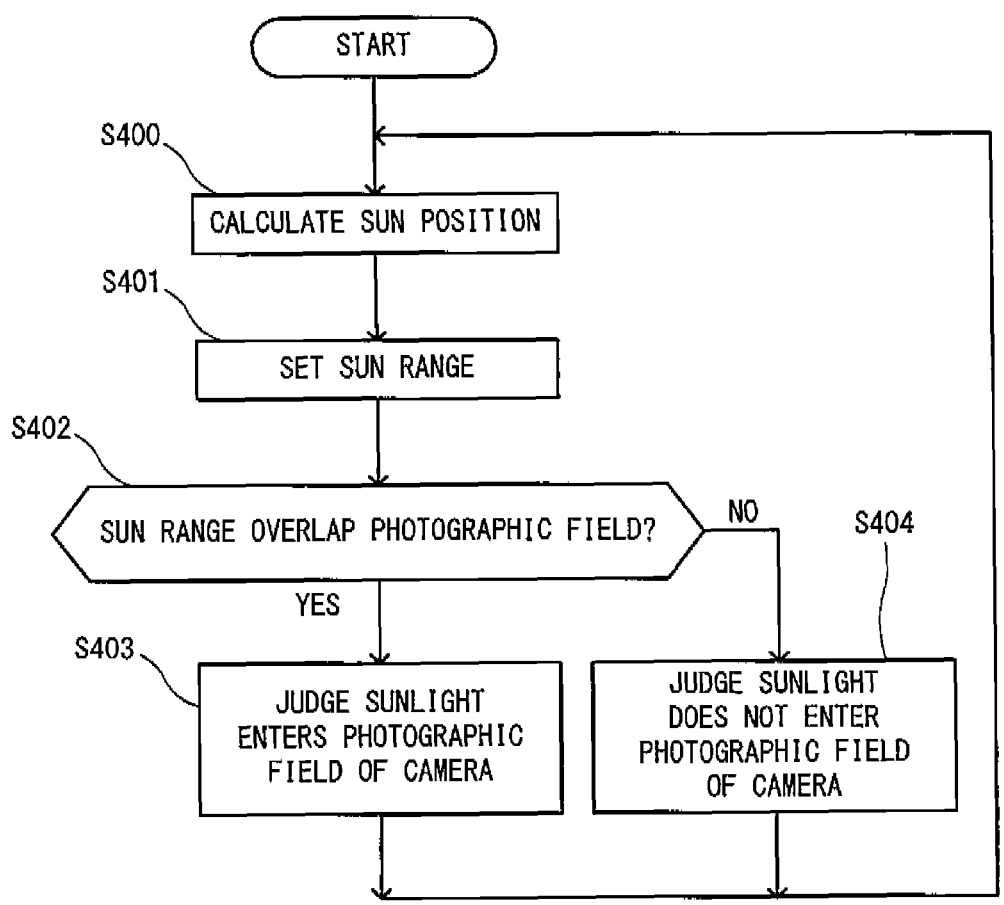

FIG. 16 presents a flowchart of the processing pertaining to the sun decision unit 34. In step S400, the control unit 2 calculates the position of the sun. In step S401, the control unit 2 sets the solar range based upon the position of the sun calculated in step S400.

In step S402, the control unit 2 makes a decision as to whether or not part of the solar range overlaps the photographic field. Namely, it makes a decision as to whether or not the solar elevation is equal to or lower than the predetermined elevation and the solar azimuth is within the predetermined range. Upon making an affirmative decision in step S402, the control unit 2 proceeds to execute the processing in step S403 in FIG. 16, whereas upon making a negative decision in step S402, the control unit 2 proceeds to execute the processing in step S404 in FIG. 16.

In step S403, the sun decision unit 34 judges that sunlight is entering the photographic field of the camera 1. In step S404, the sun decision unit 34 judges that sunlight is not entering the photographic field of the camera 1. Upon completing the processing in step S403 or step S404, the control unit 2 proceeds to execute the processing in step S400.

(BSW Control Unit 35)

The BSW control unit 35 in FIG. 4 controls the BSW unit 32 by setting a first threshold value α based upon the detection results provided by the opacity detection unit 33, the decision-making results provided by the sun decision unit 34 and a photographic image input thereto from the image acquisition unit 31. FIG. 17 presents an example of a value setting table pertaining to the first threshold value α set by the BSW control unit 35. The value setting table in FIG. 17 may be stored in the storage unit 6 as a lookup table. In such a case, the BSW control unit 35 sets the first threshold value α by referencing the lookup table stored in the storage unit 6 based upon the detection results provided by the opacity detection unit 33 and the decision-making results provided by the sun decision unit 34.

In the table shown in FIG. 17, the parameters referenced when setting the first threshold value α include road surface reflection. The decision as to whether or not light is reflected off the road surface is made based upon the photographic image input to the BSW control unit 35 from the image acquisition unit 31.

Figure 18:
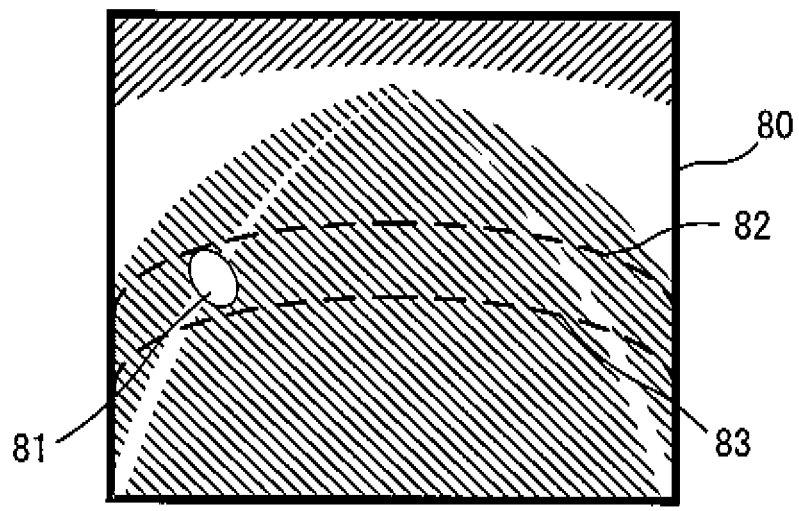

FIG. 18 illustrates how the decision as to whether or not light is reflected off the road surface is made. FIG. 18 shows a photographic image 80 that includes a high luminance area 81. If the number of pixels present in the high luminance area is equal to or greater than a predetermined value and the gravitational center of the high luminance area is between an upper limit line 82 and a lower limit line 83, indicated with dotted lines in FIG. 18, the BSW control unit 35 decides that the high luminance in the high luminance area is caused by road surface reflection.

Sunlight reflected off the road surface appears in the photographic image at a position further down in FIG. 18 as the solar elevation increases. Sunlight reflected off the road surface no longer enters the photographic lens in camera 1 once the solar elevation becomes equal to or higher than a predetermined elevation Q1. In addition, sunlight reflected off the road surface is less bright when the solar elevation is equal to or lower than a predetermined elevation Q2 and under these conditions, the effect of the sunlight reflected off the road surface on the photographic image can be disregarded. The upper limit line 82 is set in correspondence to the predetermined elevation Q2 determined through testing or the like, whereas the lower limit line 83 is set in correspondence to the predetermined elevation Q1 determined through testing or the like. In the following description, the area enclosed by the upper limit line 82 and the lower limit line 83 will be referred to as a sunlight reflection area.

In FIG. 17, each first threshold value α is indicated as a specific level. The actual threshold value α takes on a value rather than a level, and a larger value is set for the first threshold value α as the corresponding level becomes higher, with the greatest value selected for the first threshold value α at level 10. The value settings for the first threshold value α corresponding to the various levels are determined in advance in the design stage of the onboard vehicle recognition device 100. It is to be noted that the table in FIG. 17 simply represents an example and the highest level does not need to be level 10.

If a value setting corresponding to the highest level (e.g., level 10 in FIG. 17) is selected for the first threshold value α by the BSW control unit 35, a negative decision is invariably made in step S140 in FIG. 11. In other words, as long as the first threshold value α is set at the highest level, the vehicle detection unit 41 always outputs detection results indicating that another car is not present, regardless of the particulars of the photographic image input from the image acquisition unit 31. Accordingly, as long as the first threshold value α is set at the highest level, the notification control unit 42 does not engage the warning output unit 3 to notify the driver of the presence of a vehicle that may collide with the subject vehicle. The BSW control unit 35 suspends engagement of the BSW function by setting the first threshold value α to the highest level as described above.

The BSW control unit 35 sets the first threshold value α to level 10 (highest level) under conditions No. 7 and No. 8 in FIG. 17. When sunlight enters the photographic field of the camera 1, the contrast becomes lowered over the entire photographic image captured with the camera 1. In addition, when the photographic lens in the camera 1 is clouded, the contrast is further lowered over the entire photographic image captured with the camera 1. Under these circumstances, the accuracy with which the BSW unit 32 detects another vehicle and the like may be compromised. The BSW control unit 35 suspends notification via the BSW unit 32 under such conditions so as to prevent erroneous detection of another vehicle and ultimately sustains the accuracy of the image recognition processing at a required level.

In addition, the BSW control unit 35 sets the first threshold value α to a lower level under a condition No. 3, relative to the level selected under a condition No. 1. The BSW control unit 35 also sets the first threshold value α to a lower level under a condition No. 5, relative to the level selected under the condition No. 1. Furthermore, the BSW control unit 35 sets the first threshold value α to a lower level under a condition No. 4, relative to the level selected under the condition No. 2. Moreover, the BSW control unit 35 sets the first threshold value α to a lower level under a condition No. 6, relative to the level selected under a condition No. 2. Namely, if either direct sunlight or clouding of the photographic lens is the only contributing factor in causing lowered contrast in the overall photographic image captured with the camera 1, the BSW control unit 35 selects a lower value for the first threshold value α so as to ensure that a lowered peak in the differential waveform, caused by the lowered contrast, can still be detected by raising the sensitivity for another vehicle detection and ultimately to ensure that another car can be detected with a high level of accuracy.

Figure 19:
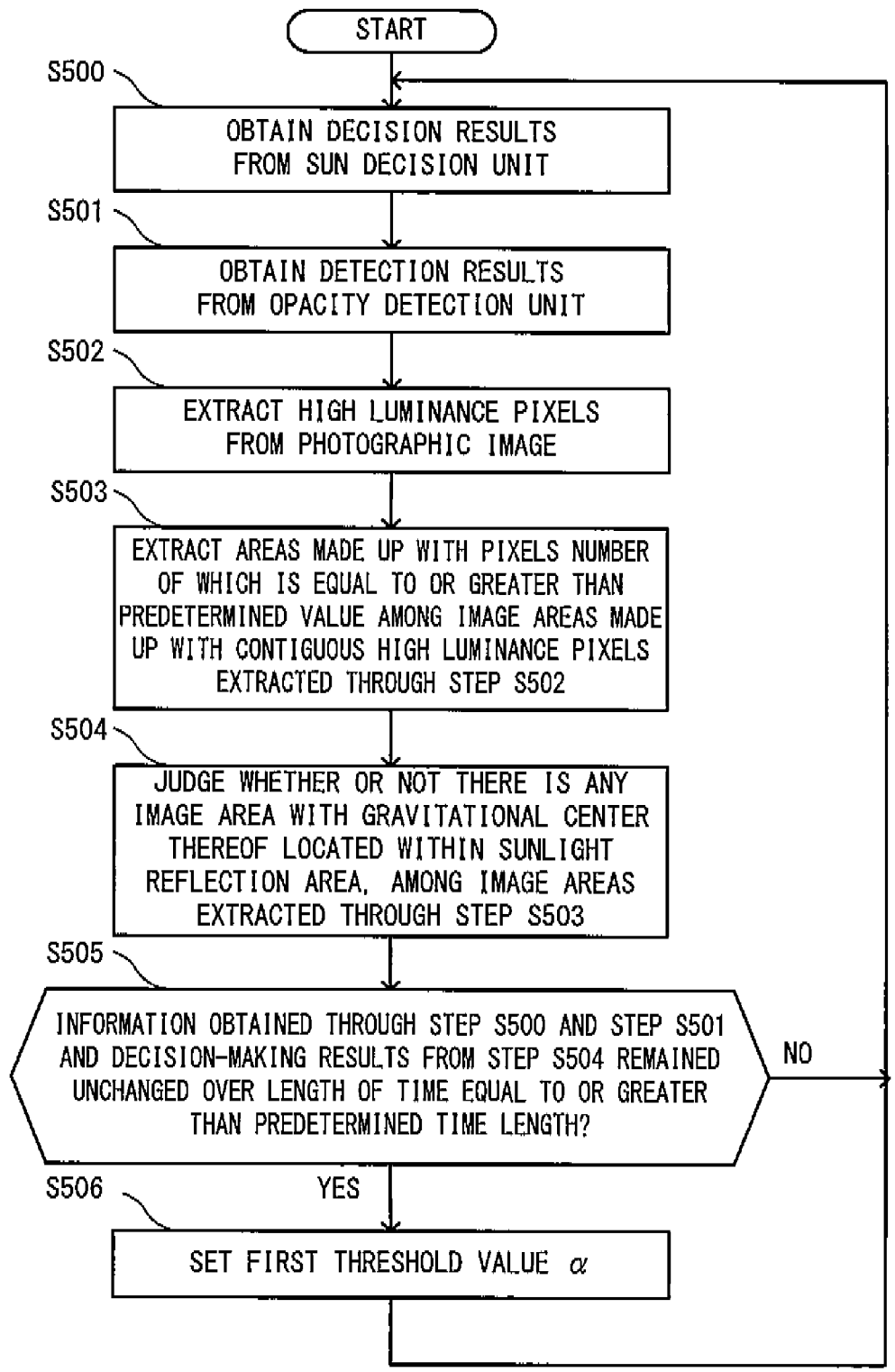

FIG. 19 presents a flowchart of the processing pertaining to the BSW control unit 35. In step S500, the control unit 2 obtains the decision-making results provided by the sun decision unit 34. Namely, information pertaining to the decision made in step S403 or step S404 in FIG. 16 is obtained.

In step S501, the control unit 2 obtains the detection results provided by the opacity detection unit 33. More specifically, it obtains information pertaining to the decision made in step S306 or step S307 in FIG. 14 from the opacity detection unit 33.

In step S502, the control unit 2 extracts pixels with high luminance (e.g. indicating luminance equal to or higher than 190 in the 256-gradation range) in the photographic image having been input thereto from the image acquisition unit 31. In step S503, the control unit 2 extracts any image area made up with pixels, the number of which is equal to or greater than a predetermined value, among pixel clusters (image areas), each made up with contiguous pixels extracted in step S502.

In step S504, the control unit 2 makes a decision as to whether or not there is an image area with its gravitational center present within the sunlight reflection area, among the image areas having been extracted in step S503. The control unit 2 calculates the gravitational center of each image area extracted in step S503. It then makes a decision as to whether or not the individual gravitational centers are located inside the sunlight reflection area. Consequently, it makes a decision as to whether or not there is even one image area, among the image areas extracted in step S503, the gravitational center of which is inside the sunlight reflection area.

In step S505, the control unit 2 makes a decision as to whether or not the information obtained in step S500 and step S501 and the decision-making results from step S504 have remained unchanged over a length of time equal to or greater than a predetermined time length. Upon making an affirmative decision in step S505, the control unit 2 proceeds to execute the processing in step S506 in FIG. 19, whereas upon making a negative decision in step S505, it proceeds to execute the processing in step S500 in FIG. 19.

In step S506, the control unit 2 sets the first threshold value α for the BSW unit 32 by referencing the table shown in FIG. 17, and subsequently, it proceeds to execute the processing in step S500 in FIG. 19.

(Notification Control Unit 42)

If the three-dimensional object detection unit 413 determines in step S220 in FIG. 12 that the three-dimensional object is another vehicle VX during a lane change or the like, the notification control unit 42 controls the warning output unit 3 so as to notify the driver of the presence of a vehicle that may collide with the subject vehicle. If, on the other hand, the three-dimensional object detection unit 413 determines in step S230 in FIG. 12 that another vehicle is not present, the notification control unit 42 does not provide the driver with such a notification.

Figure 20:
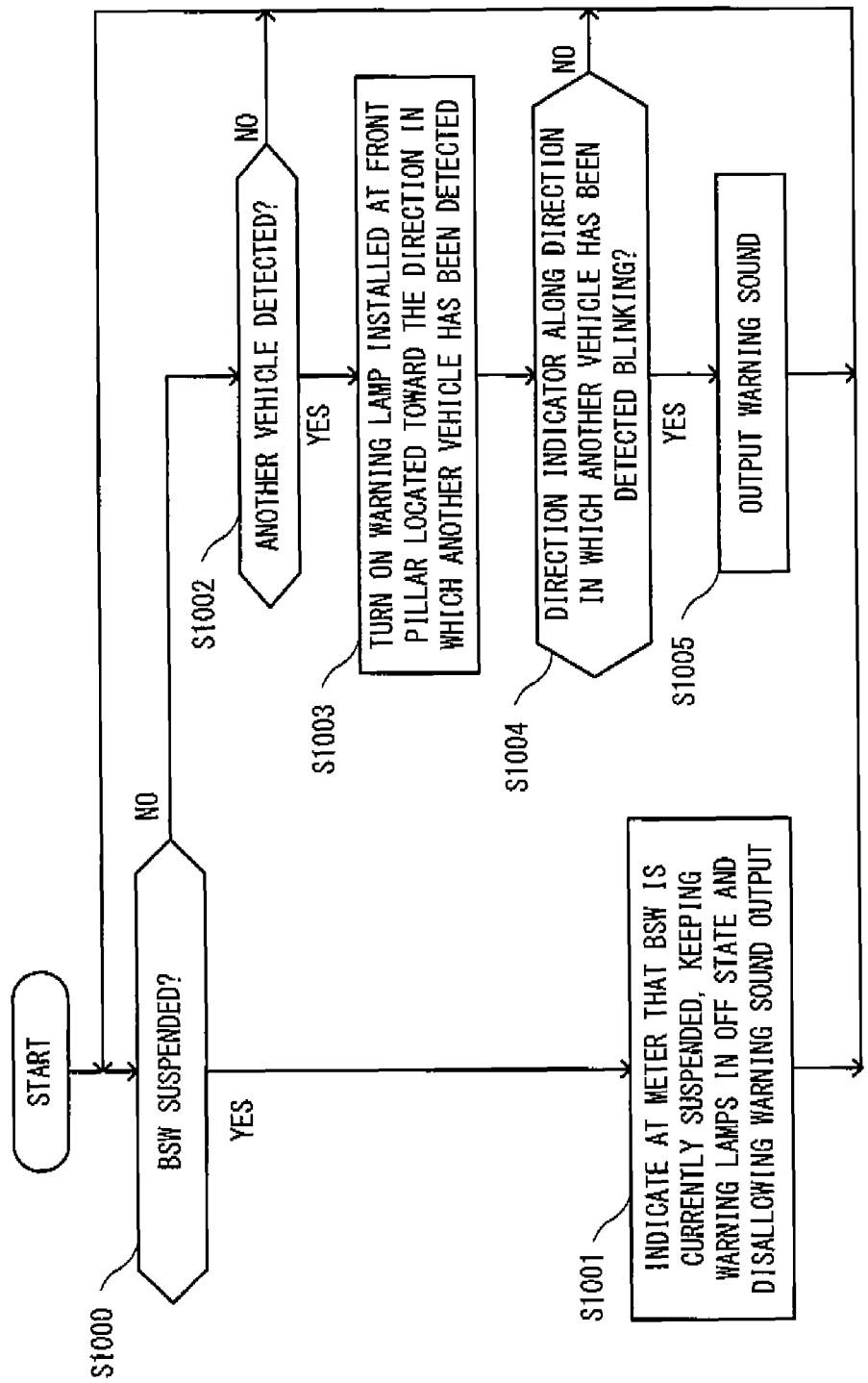

FIG. 20 presents a flowchart pertaining to the notification control unit 42. In step S1000, the control unit 2 makes a decision as to whether or not the BSW function is suspended. This decision may be made by deciding, for instance, whether or not the first threshold value α is set to level 10. Upon making an affirmative decision in step S1000, the control unit 2 proceeds to execute the processing in step S1001, whereas upon making a negative decision in step S1000, it proceeds to execute the processing in step S1002.

In step S1001, the control unit 2 notifies, via the operating state reporting unit 4 (e.g., a meter in the subject vehicle V) that the BSW function is currently suspended and thus the warning lamps will not be turned on or the alarm will not sound.

In step S1002, the control unit 2 makes a decision as to whether or not another vehicle VX has been detected by the three-dimensional object detection unit 413. Upon making an affirmative decision in step S1002, the control unit 2 proceeds to execute the processing in step S1003, whereas upon making a negative decision in step S1002, it proceeds to execute the processing in step S1000.

In step S1003, the control unit 2 turns on a warning lamp constituting part of the warning output unit 3, which is located at the front pillar indicating the side where the other vehicle has been detected by the three-dimensional object detection unit 413.

In step S1004, the control unit 2 makes a decision as to whether or not a direction indicator, among the direction indicators installed in the subject vehicle V, located to indicate the side where the other vehicle VX has been detected by the three-dimensional object detection unit 413, is blinking. The blinking state of the direction indicator may be ascertained through the CAN communication shown in FIG. 1. Upon making an affirmative decision in step S1004, the control unit 2 proceeds to execute the processing in step S1005, whereas upon making a negative decision in step S1004, it proceeds to execute the processing in step S1000.

In step S1005, the control unit 2 outputs a warning sound via an alarm buzzer in the warning output unit 3.

The following advantages are achieved through the first embodiment described above.

The control unit 2 in the onboard vehicle recognition device 100 includes the image acquisition unit 31, the sun decision unit 34, the opacity detection unit 33, the vehicle detection unit 41 and the BSW control unit 35.

The image acquisition unit 31 obtains a photographic image of an area outside the vehicle captured and output by the camera 1.

The sun decision unit 34 calculates (in step S400 in FIG. 16) the position of the sun indicating, at least, the solar elevation, and makes a decision at least as to whether or not the solar elevation is equal to or lower than a predetermined elevation (step S402 in FIG. 16).

The opacity detection unit 33 detects clouding of the lens surface of the photographic lens in the camera 1 at least over areas corresponding to the detection area A1 and the detection area A2 (step S307 in FIG. 14).

The vehicle detection unit 41 detects another vehicle from an image area in the photographic image corresponding to the detection area A1 or A2 (step S220 in FIG. 12).

If the opacity detection unit 33 detects clouding of the lens surface at least over an area corresponding to the detection area A1 or A2 and the sun decision unit 34 decides that the solar elevation is equal to or lower than the predetermined elevation, the BSW control unit 35 at least adjusts the first threshold value α to the highest level so as to suspend detection of another vehicle by the vehicle detection unit 41 (step S506 in FIG. 19, No. 7 and No. 8 in FIG. 17).

The on-board vehicle recognition device 100 adopting these measures assures high accuracy in image recognition processing even when sunlight enters the photographic image.

Second Embodiment

Figure 21:
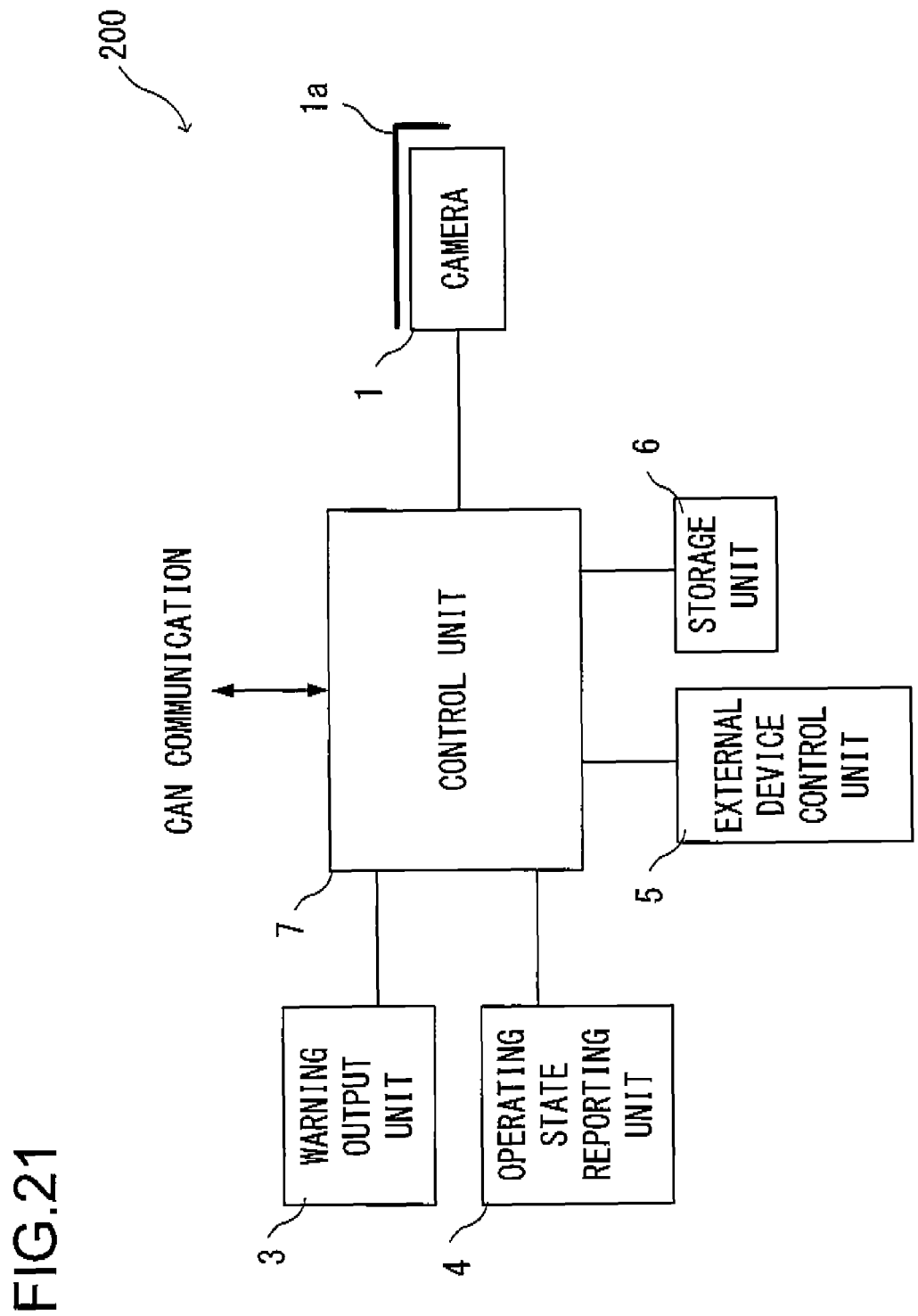

The second embodiment of the present invention will be described next. FIG. 21 is a block diagram showing the configuration of an onboard vehicle recognition device 200 achieved in the second embodiment of the present invention. The onboard vehicle recognition device 200 in FIG. 21 differs from the onboard vehicle recognition device 100 in the first embodiment only in that it includes a control unit 7 instead of the control unit 2. An explanation of structural components of the onboard vehicle recognition device 200 shown in FIG. 21, which are identical to those in the onboard vehicle recognition device 100, will not be provided.

As does the control unit 2, the control unit 7 executes a specific type of image processing on a photographic image output from the camera 1 by executing a program stored in the storage unit 6 and then executes various types of control based upon the processing results. Under the control executed by the control unit 7, various functions such as the LDW function, the BSW function, the MOD function, the PED function, the RSR function and the IMD function are achieved in the on-board vehicle recognition device 200.

Figure 22:
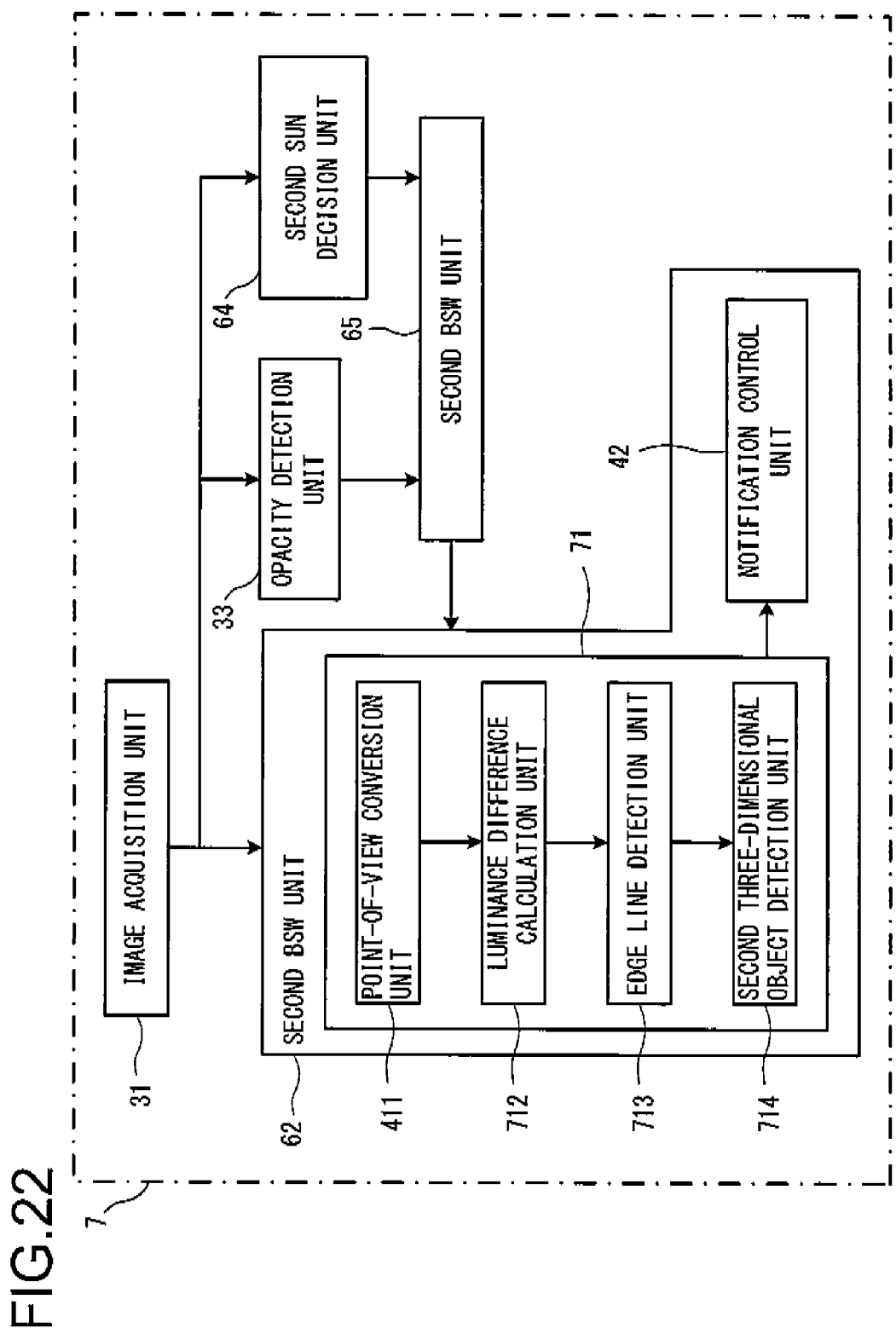

FIG. 22 is a control block diagram pertaining to the BSW-related control executed by the control unit 7. As FIG. 22 illustrates, the control unit 7 includes an image acquisition unit 31, a second BSW unit 62, an opacity detection unit 33, a second sun decision unit 64 and a second BSW control unit 65. The same reference numerals are assigned to components similar to those in the control block diagram presented in FIG. 4 so as to preclude the necessity for a repeated explanation.

The second BSW unit 62 includes a second vehicle detection unit 71 and a notification control unit 42. The second vehicle detection unit 71, in turn, includes a point-of-view conversion unit 411, a luminance difference calculation unit 712, an edge line detection unit 713 and a second three-dimensional object detection unit 714.

FIGS. 23(*a*) and 23(*b*) illustrate detection areas set for three-dimensional object detection executed by the second BSW unit 62. FIG. 23(*a*) is a plan view, whereas FIG. 23(*b*) provides a side view perspective of an area behind the subject vehicle V. Detection areas A3 and A4 shown in FIG. 23(*a*) assume a trapezoidal shape in a plan view (a bird's-eye view), and the positions, the size and the shape of the detection areas A3 and A4 are determined based upon distances d1 through d4. These detection areas A3 and A4 are set by the second three-dimensional object detection unit 714 in place of the detection areas A1 and A2.

The distance d1 is a distance ranging from the subject vehicle V to the grounding line L1 or L2. The distance d1 is determined based upon a distance d11 between the subject vehicle V and a white line W and a distance d12 ranging from the white line W to a position to which another vehicle VX is predicted to travel. The distance d1 may be, for instance, the sum of the distances d11 and d12. Since the position of the other vehicle VX on the road and the position of the subject vehicle V on the road can be roughly predicted, the distance d11 and the distance d12 are determined as substantially fixed values and thus, the distance d1, too, is determined as a substantially fixed value. It is to be noted that the control unit 7 may recognize the position of the white line W relative to the subject vehicle V through a white line recognition technology of the known art and then may determine the distance d11 based upon the position of the white line W thus recognized.

The distance d2 ranges from the rear end of the subject vehicle V along the direction opposite from the vehicle advancing direction. This distance d2 is selected so that the detection areas A3 and A4 are contained within, at least, the angle of view of the camera 1. In the particular example presented in FIG. 23(*a*), the distance d2 is set so as to reach the range defined by the angle of view a.

The distance d3 indicates the length of the detection areas A3 and A4, measured along the vehicle advancing direction. This distance d3 is determined based upon the size of the detection target three-dimensional object. The distance d3 may be set to, for instance, a length that includes the other vehicle VX.

The distance d4 is a distance indicating a height set so that its range includes the tires of the other vehicle VX or the like in real space as shown in FIG. 23(*b*). The distance d4 assumes a range such as that indicated in FIG. 23(*a*) in a bird's-eye view. It is to be noted that the distance d4 may be a length set so that it does not include a lane beyond the lane adjacent to the lane in which the vehicle V is traveling either on the right side or on the left side in a bird's-eye view (i.e., the second next lane from the lane in which the vehicle V is traveling). The rationale for setting the distance d4 in this manner is that if the distance d4 were set so that it ranged into the lane beyond the lane adjacent to the lane in which the subject vehicle V is traveling, it would not be possible to distinguish another vehicle VX present in the adjacent lane directly to the left or to the right of the subject lane, i.e., the lane in which the subject vehicle V was traveling, from another vehicle VX present in the lane beyond the adjacent lane.

The distances d1 through d4 are determined as described above, and the positions, the size and shape of the detection areas A3 and A4 are determined based upon these distances. In more specific terms, the distance d1 determines the positions of upper sides b1 of the detection areas A3 and A4 assuming a trapezoidal shape. The distance d2 determines the positions C1 of the starting points of the upper sides b1. The distance d3 determines the positions C2 of the ending points of the upper sides b1. Straight lines L3 extending toward the starting point positions C1 from the camera 1 define lateral sides b2 of the trapezoidal detection areas A3 and A4. Likewise, straight lines L4 extending toward the ending point positions C2 from the camera 1 define lateral sides b3 of the trapezoidal detection areas A3 and A4. The distance d4 determines the positions of lower sides b4 of the trapezoidal detection areas A3 and A4. The areas enclosed by the sides b1 through b4 defined as described above are the detection areas A3 and A4. As FIG. 23(*b*) indicates, the detection areas A3 and A4 each take on the shape of a true quadrangle (rectangle) in real space on each side of the subject vehicle V behind the subject vehicle V.

(Luminance Difference Calculation Unit 712)

The luminance difference calculation unit 712 calculates luminance differences by using the bird's-eye view image data resulting from the point-of-view conversion executed by the point-of-view conversion unit 411, in order to detect edges of a three-dimensional object included in the bird's-eye view image. In correspondence to each of a plurality of positions set along a virtual vertical line extending along the vertical direction in real space, the luminance difference calculation unit 712 calculates the luminance difference between the levels of luminance at two pixels present in the vicinity of the particular position. The luminance difference calculation unit 712 is able to calculate luminance differences either through a method in which a single virtual vertical line extending along the vertical direction in real space is set or through a method in which two virtual vertical lines are set.

The method in which two virtual vertical lines are set will be explained in more specific terms. The luminance difference calculation unit 712 sets a first virtual vertical line equivalent to a line segment extending along the vertical direction in real space and a second virtual vertical line, different from the first virtual vertical line, which is equivalent to a line segment extending along the vertical direction in real space, in the bird's-eye view image resulting from the point-of-view conversion. The luminance difference calculation unit 712 calculates difference values each indicating the difference between the luminance at a point on the first virtual vertical line and the luminance at a point on the second virtual vertical line, successively along the first virtual vertical line and the second virtual vertical line. The following is a detailed description of the operation executed by the luminance difference calculation unit 712.

FIGS. 24(a) and 24(b) present examples of the first virtual vertical line and the second virtual vertical line. FIG. 24(a) shows a first virtual vertical line La (hereafter referred to as a subject line La) and a second virtual vertical line Lr (hereafter referred to as a reference line Lr) set by the luminance difference calculation unit 712. The subject line La and the reference line Lr, corresponding to line segments extending along the vertical direction in real space, pass through the detection area A3. The reference line Lr is set at a position apart from the subject line La by an extent matching a predetermined distance in real space. It is to be noted that lines corresponding to line segments extending along the vertical direction in real space extend radially from a position Ps of the camera 1 in the bird's-eye view image. These radial lines each range along the direction in which a three-dimensional object is skewed in the bird's-eye view conversion.

The luminance difference calculation unit 712 sets a subject point Pa (a point on the first virtual vertical line) on the subject line La. In addition, the luminance difference calculation unit 712 sets a reference point Pr (a point on the second virtual vertical line) on the reference line Lr. The subject line La, the subject point Pa, the reference line Lr and the reference point Pr assume the relationship shown in FIG. 24(b) in real space. As FIG. 24(b) clearly indicates, the subject line La and the reference line Lr extend along the vertical direction in real space, and the subject point Pa and the reference point Pr are points set at heights that substantially match each other in real space. It is to be noted that the subject point Pa and the reference point Pr do not need to assume exactly the same height and that a slight error is tolerated, as long as the subject point Pa and the reference point Pr can be regarded to assume heights substantially equal to each other.

The luminance difference calculation unit 712 calculates the luminance difference between the subject point Pa and the reference point Pr. A significant difference between the luminance at the subject point Pa and the luminance at the reference point Pr may be attributable to an edge present between the subject point Pa and the reference point Pr. Accordingly, the edge line detection unit 713 shown in FIG. 22 detects an edge line based upon the luminance difference between the subject point Pa and the reference point Pr.

Figure 25:
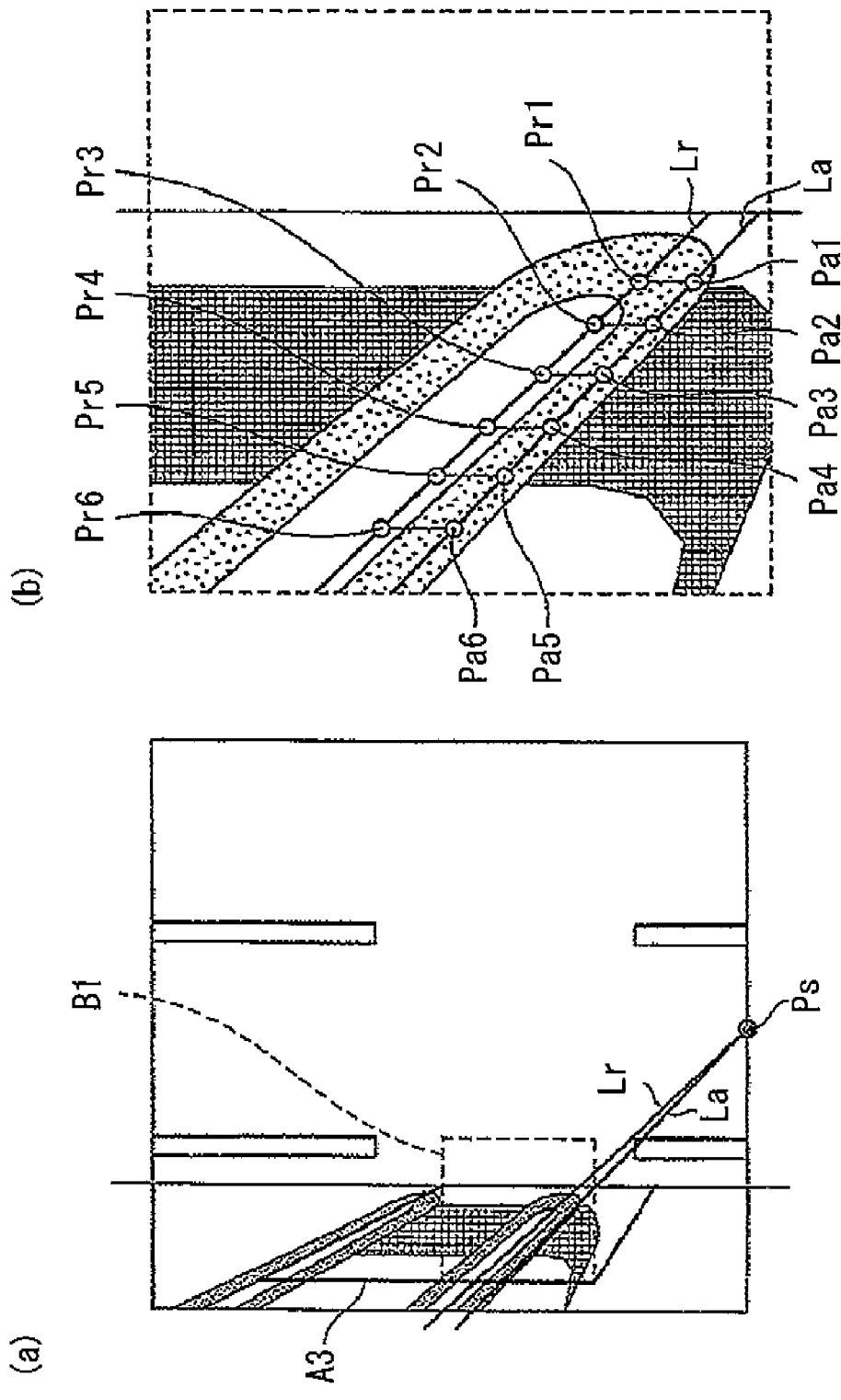

This operation will be explained in further detail. FIG. 25 illustrates the operation of the luminance difference calculation unit 712 in detail, with FIG. 25(a) presenting a bird's-eye view image and FIG. 25(b) presenting an enlarged view of a portion B1 of the bird's-eye view image in FIG. 25(a). It is to be noted that while an explanation will be given in reference to the detection area A3 shown in FIGS. 25(a) and 25(b), the luminance differences are calculated through a similar procedure in correspondence to the detection area A4.

If the photographic image captured by the camera 1 includes another vehicle VX, the other vehicle VX appears in the detection area A3 in the bird's-eye view image, as shown in FIG. 25(a). In the example presented in FIG. 25(b) showing the area B1 in FIG. 25(a) in an enlargement, the subject line La is set over the rubber of a tire of the other vehicle VX. Under these conditions, the luminance difference calculation unit 712 first sets the reference line Lr. The reference line Lr is set along the vertical direction at a position set apart from the subject line La by an extent equivalent to a predetermined distance in real space. More specifically, in the camera 1 achieved in the embodiment, the reference line Lr is set at a position away from the subject line La by an extent equivalent to 10 cm in real space. The reference line Lr is thus set on, for instance, the wheel of the other vehicle VX, which is set apart from the tire rubber of the other vehicle VX by an extent equivalent to 10 cm in the bird's-eye view image.

Next, The luminance difference calculation unit 712 sets a plurality of subject points Pa1 through PaN on the subject line La. FIG. 25(b) provides a simplified illustration with six subject points Pa1 through Pa6 set on the subject line La (hereafter, a given subject point will simply be referred to as a subject point Pai). It is to be noted that any number of subject points Pa may be set on the subject line La. The following explanation will be given by assuming that N subject points Pa are set on the subject line La.

Next, the luminance difference calculation unit 712 sets reference points Pr1 through PrN so that the heights of the individual reference points respectively match the heights of the subject points Pa1 through PaN in real space. The luminance difference calculation unit 712 then calculates the luminance difference between the luminance at the subject point Pa and the luminance at the reference point Pr at each matching height. Through this operation, the luminance difference calculation unit 712 calculates the luminance difference between two pixels at each matching position among the plurality of positions (1 through N) set along the virtual vertical lines extending along the vertical direction in real space. For instance, the luminance difference calculation unit 712 calculates the luminance difference between the first subject point Pa1 and the first reference point Pr1 and calculates the luminance difference between the second subject point Pa2 and the second reference point pr2. In this manner, the luminance difference calculation unit 712 determines consecutive luminance differences along the subject line La and the reference line Lr. In other words, the luminance difference calculation unit 712 sequentially calculates the luminance differences between the third through Nth subject points Pa3 through PaN and the third through Nth reference points Pr3 through PrN.

The luminance difference calculation unit 712 repeatedly executes the processing described above by shifting the subject line La within the detection area A3 so as to set the reference line Lr, set the subject points Pa and the reference points Pr and calculate the luminance differences in correspondence to each new subject line La. In other words, the luminance difference calculation unit 712 repeatedly executes the processing described above by offsetting both the subject line La and the reference line Lr by the same distance along the direction in which the grounding line L1 extends in real space. The luminance difference calculation unit 712 sequentially calculates the luminance differences by setting a new subject line La at the position taken by the reference line Lr in the previous session and setting a new reference line Lr in correspondence to this subject line La.

(Edge Line Detection Unit 713)

The edge line detection unit 713 in FIG. 22 detects an edge line based upon the luminance differences consecutively calculated by the luminance difference calculation unit 712. In the example presented in FIG. 25(b), the luminance difference between the first subject point Pa1 and the first reference point Pr1 is small, since both points assume positions on the tire. However, while the second through sixth subject points Pa2 through Pa6 take positions in the tire rubber, the second through sixth reference points Pr2 through Pr6 take positions in the wheel. As a result, the luminance differences between the second through sixth subject points Pa2 through Pa6 and the second through sixth reference points Pr2 through Pr6 are large. Thus, the edge line detection unit 713 is able to detect the presence of an edge line between the second through sixth subject points Pa2 through Pa6 and the second through sixth reference points Pr2 through Pr6 manifesting the large luminance differences.

In more specific terms, the edge line detection unit 713 engaged in edge line detection first defines an attribute of the ith subject point Pai based upon the luminance difference between the ith subject point Pai (coordinates (xi, yi)) and the ith reference points Pri (coordinates (xi', yi')) as expressed in (1) below.

When $l(xi,yi) > l(xi',yi') + t$, $s(xi,yi) = 1$

When $l(xi,yi) < l(xi',yi') - t$, $s(xi,yi) = -1$

Otherwise $s(xi,yi) = 0$ (expression 1)

In (expression 1) above, t represents a threshold value, l(xi, yi) indicates the luminance value at the ith subject point Pai and l(xi', yi') indicates the luminance value at the ith reference point Pri. According to (expression 1), the attribute s(xi, yi) of a given subject point Pai is defined as "1" if the luminance value at the subject point Pai is higher than a luminance value representing the sum of the luminance point at the reference point Pri and the threshold value t. If, on the other hand, the luminance value at the subject point Pai is lower than a luminance value obtained by subtracting the threshold value t from the luminance value at the reference point Pri, the attribute s(xi, yi) of the subject point Pai is defined as "−1". If the luminance value at the subject point Pai and the luminance value at the reference point Pri have a relationship other than these, the attribute s(xi, yi) of the subject point Pai is defined as "0". The threshold value t may be a specific value selected in advance or it may be set by the second BSW control unit 65.

Next, the edge line detection unit 713 makes a decision, based upon continuity c(xi, yi) of the attribute s along the subject line La, as to whether or not the subject line La is an edge line, as expressed in (2) below.

When $s(xi,yi) = s(xi+1, yi+1) \neq 0$, $c(xi,yi) = 1$

Otherwise, $c(xi,yi) = 0$ (expression 2)

When the attribute s(xi, yi) of the subject point Pai and the attribute s(xi+1, yi+1) of the next subject point Pai+1 match, the continuity c(xi, yi) takes a value of "1". When the attribute s(xi, yi) of the next subject point Pai and the attribute s(xi+1, yi+1) of the subject point Pai+1 do not match, the continuity c(xi, yi) takes a value of "0".

Next, the edge line detection unit 713 calculates the total sum of the values taken for the continuity c at all the subject points Pa on the subject line La. The edge line detection unit 713 then normalizes the continuity c by dividing the total sum of the values for the continuity c thus calculated by the quantity N of the subject points Pa. If the normalized value exceeds a threshold value θ, the edge line detection unit 713 judges that the subject line La is an edge line. It is to be noted that a value determined through testing or the like is set in advance as the threshold value θ. The threshold value θ is set by the second BSW control unit 65.

Namely, the edge line detection unit 713 makes a decision as to whether or not the subject line La is an edge line as expressed in (3) below. The edge line detection unit 713 makes a decision as to whether or not each of the subject lines La drawn on the detection area A3 is an edge line.

$\Sigma c(xi,yi)/N > 0$ (expression 3)

(Second Three-Dimensional Object Detection Unit 714)

The second three-dimensional object detection unit 714 in FIG. 22 detects a three-dimensional object based upon the quantity of edge lines detected by the edge line detection unit 713. As explained earlier, the control unit 7 detects edge lines extending along the vertical direction in real space. When edge lines extending along the vertical direction are detected in a large number, the likelihood of a three-dimensional object being present in the detection area A3 or A4 is high. Accordingly, the second three-dimensional object detection unit 714 detects a three-dimensional object based upon the quantity of edge lines detected by the edge line detection unit 713. In addition, prior to the three-dimensional object detection, the second three-dimensional object detection unit 714 makes a decision as to whether or not the individual edge lines having been detected by the edge line detection unit 713 are proper edge lines. The second three-dimensional object detection unit 714 makes a decision as to whether or not the extent of change in the luminance occurring along each edge line in the bird's-eye view image is greater than a predetermined threshold value. If the extent of change in the luminance in the bird's-eye view image occurring on the edge line is greater than the threshold value, the particular edge line is judged to have been detected through erroneous decision-making. If, on the other hand, the extent of change in luminance in the bird's-eye view image occurring on the edge line is not greater than the threshold value, the edge line is determined to be correct or proper. It is to be noted that a value determined through testing or the like is set in advance as the threshold value.

Figure 26:
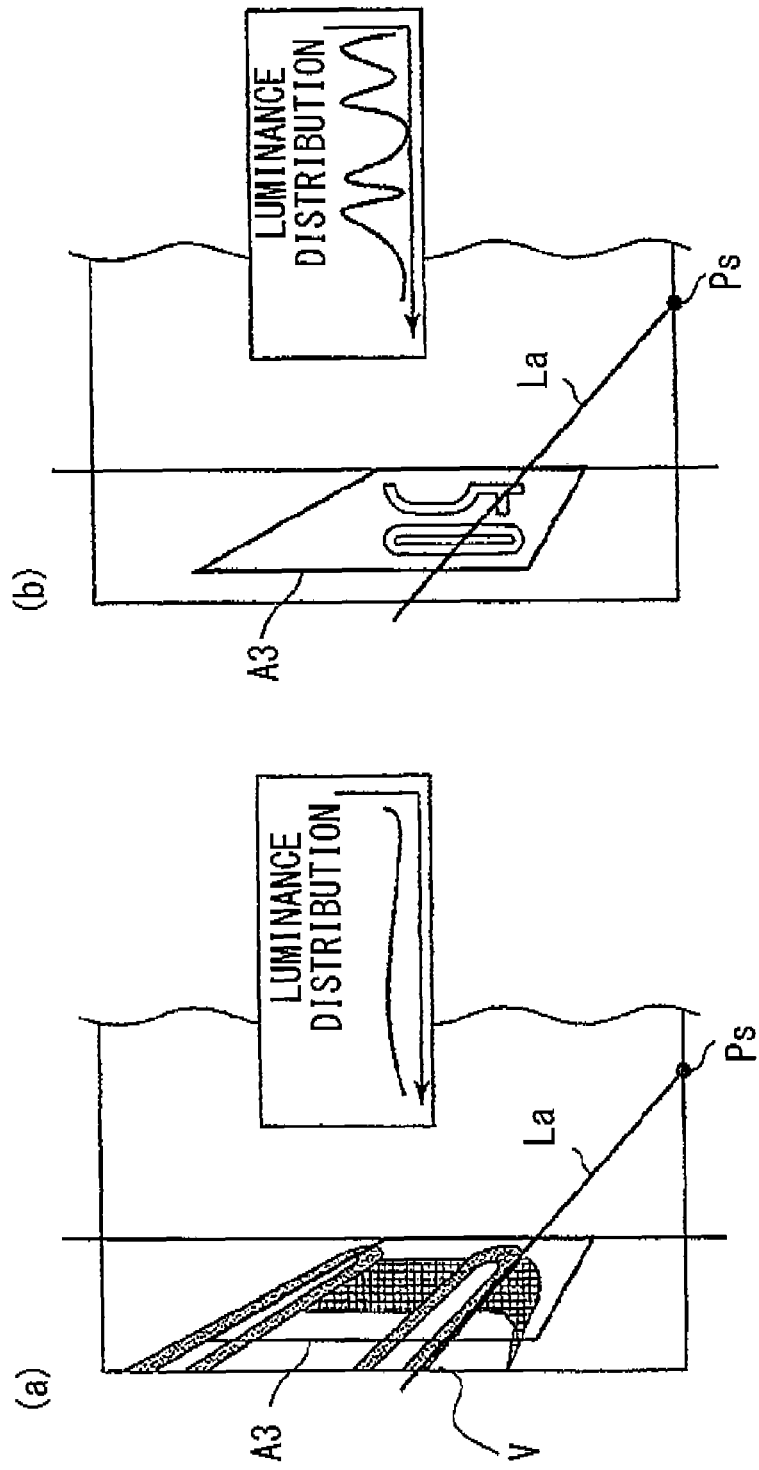

FIG. 26 shows edge line luminance distributions, with FIG. 26(*a*) showing an edge line detected when another vehicle VX, i.e., a three-dimensional object, is present in the detection area A3 and the corresponding luminance distribution and FIG. 26(*b*) showing an edge line detected when no three-dimensional object is present in the detection area A3 and the corresponding luminance distribution.

As shown in FIG. 26(*a*), a subject line La set in the rubber area of a tire of the other vehicle VX in the bird's-eye view image has been determined to be an edge line. In this situation, the luminance in the bird's-eye view image changes gently on the subject line La, since the tire of the other vehicle VX becomes stretched out in the bird's-eye view image resulting from the point-of-view conversion of the image captured by the camera 1. In the example presented in FIG. 26(*b*), a subject line La set over white characters "50" painted on the road surface in the bird's-eye view image is judged to be an edge line through erroneous decision-making. In this case, the luminance in the bird's-eye view image on the subject line La spikes and drops off sharply, since areas with high luminance in the white characters and areas with low luminance in the road surface or the like are both present on the edge line.

Based upon such varying characteristics of luminance distributions to manifest on the subject lines La, the second three-dimensional object detection unit 713 makes a decision as to whether or not a given edge line has been detected through erroneous decision-making. If the change in the luminance occurring along the edge line is greater than the predetermined threshold value, the second three-dimensional object detection unit 714 decides that the particular edge line has been detected through erroneous decision-making. Accordingly, this edge line is not used in the three-dimensional object detection. Through these measures, it is ensured that white characters, such as "50", on the road surface or grass at the shoulder of the road is not recognized as an edge line and thus, the accuracy of the three-dimensional object detection is not lowered.

More specifically, the second three-dimensional object detection unit 714 calculates the extent of change in the luminance along the edge line, as expressed in (4) or (5) below. The extent of change in luminance occurring along the edge line is equivalent to an evaluation value calculated along the vertical direction in real space. In expression (4) below, the luminance distribution is evaluated based upon the sum of squares, each calculated by squaring the difference between the luminance value l(xi, yi) at the ith subject point on the subject line La and the (i+1)th luminance value l(xi+1, yi+1) at the next subject point on the subject line La. In expression (5) below, the luminance distribution is evaluated based upon the sum of absolute values, each representing the difference between the luminance value l(xi, yi) at the ith surface point on the subject line La and the (i+1)th luminance value l(xi+1, yi+1) at the next subject point on the subject line La.

Evaluation value along direction equivalent to vertical direction=$\Sigma[\{l(xi,yi)-l(xi+1,yi+1)\}^2]$   (expression 4)

Evaluation value along direction equivalent to vertical direction=$\Sigma|l(xi,yi)-l(xi+1,yi+1)|$   (expression 5)

It is to be noted that instead of (expression 5), (expression 6) below may be used to calculate the evaluation value by binarizing an attribute b of consecutive luminance values in reference to a threshold value t2 and then calculating the total sum of the binarized values representing the attribute b in correspondence to all the subject points Pa.

Evaluation value along direction equivalent to the vertical direction=$\Sigma b(xi,yi)$ When $|l(xi,yi)-l(xi+1,yi+1)|>t2, b(xi,yi)=1$, Otherwise $b(xi,yi)=0$   (expression 6)

When the absolute value of the luminance difference between the luminance value at the subject point Pai and the luminance value at the next point Pai+1 is greater than the threshold value t2, the attribute b(xi, yi) of the particular subject point Pa(xi, yi) takes the value "1". When the luminance values have a relationship other than this, the attribute b(xi, yi) of the subject point Pai takes a value of "0". A value determined through testing or the like is set in advance as the threshold value t2, which is used when determining that the subject line La is not on the same three-dimensional object. The second three-dimensional object detection unit 714 then calculates the total sum of the values representing the attribute b of all the subject points Pa set on the subject line La and, based upon the total sum used as the evaluation value along the direction equivalent to the vertical direction, it makes a decision as to whether or not the particular edge line has been detected to be correct.

(Second Vehicle Detection Unit 71)

Figure 27:
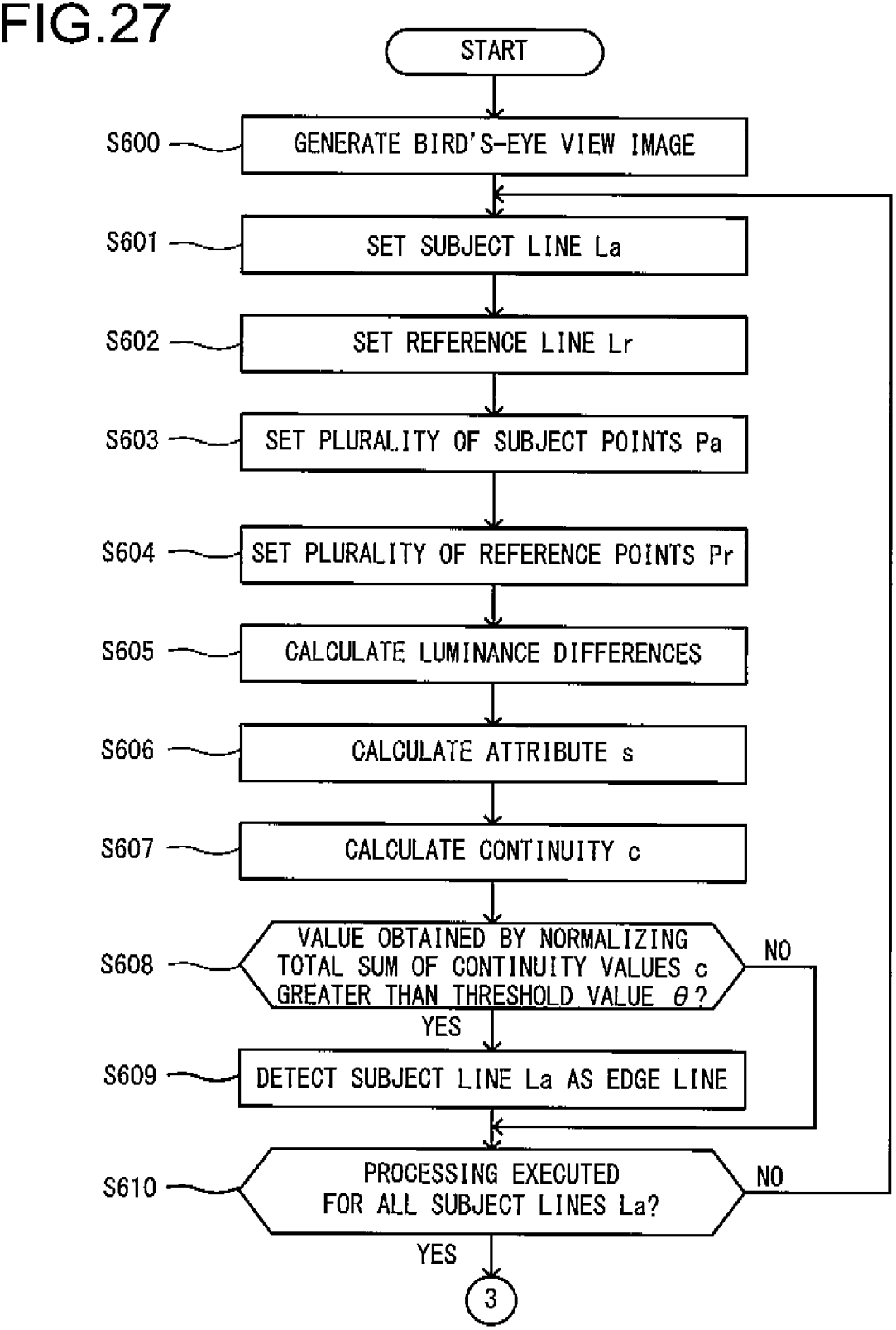
Figure 28:
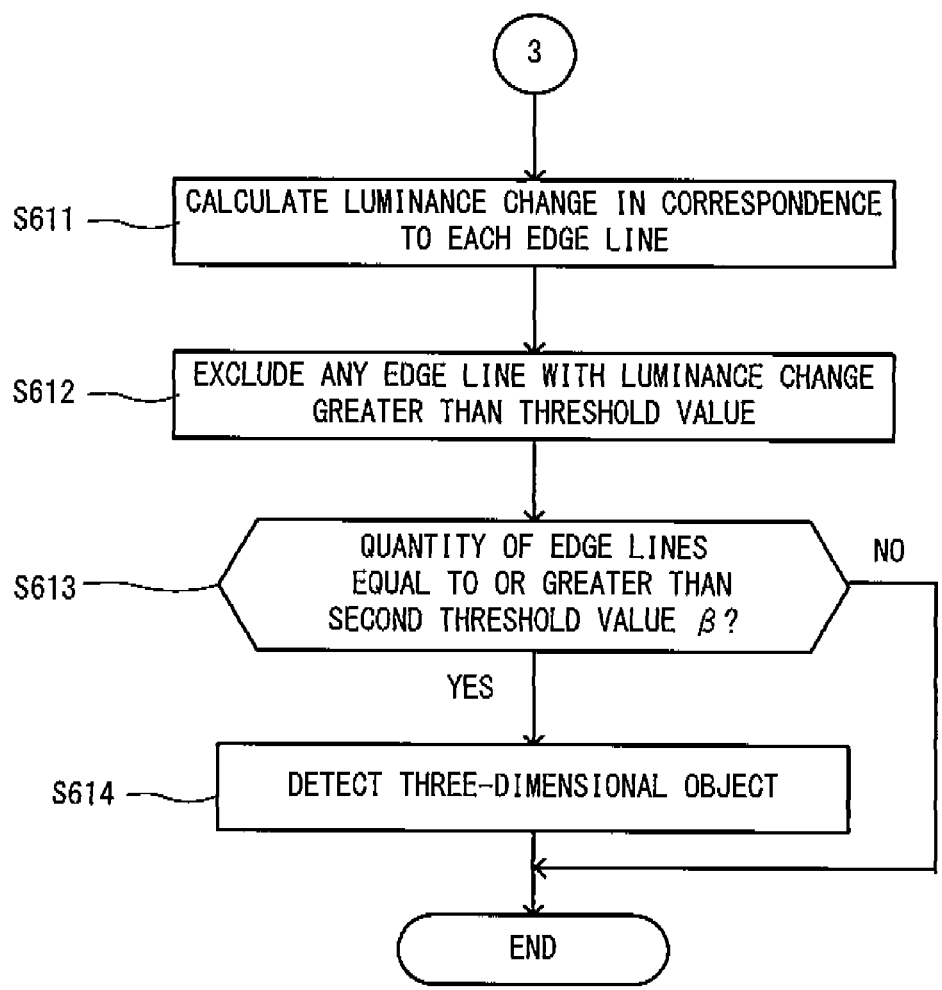

FIG. 27 and FIG. 28 each present a flowchart of the processing pertaining to the second vehicle detection unit 71, executed by the control unit 7. It is to be noted that while an explanation is given in reference to FIG. 27 and FIG. 28 on the processing executed for the detection area A3 for simplification, similar processing is executed for the detection area A4.

In step S600, the point-of-view conversion unit 411 generates bird's-eye view image data based upon the photographic image information for a photographic image obtained by the image acquisition unit 31.

In step S601, the luminance difference calculation unit 712 sets a subject line La on the detection area A3. At this time, the luminance difference calculation unit 712 sets a line equivalent to a line extending along the vertical direction in real space, as the subject line La.

In step S602, the luminance difference calculation unit 712 sets a reference line Lr on the detection area A3. At this time, the luminance difference calculation unit 712 sets a line corresponding to a line segment extending along the vertical direction in real space, which is set apart from the subject line La by an extent equivalent to a predetermined distance in real space, as the reference line Lr.

In step S603, the luminance difference calculation unit 712 sets a plurality of subject points Pa on the subject line La. In this step, the luminance difference calculation unit 712 sets subject points Pa in a quantity that would not pose any problem during the edge detection executed by the edge line detection unit 713.

In step S604, the luminance difference calculation unit 712 sets reference points Pr so that the heights of the subject points Pa and the corresponding reference points Pr substantially match each other in real space. By setting the reference points Pr in this manner, it is ensured that a given subject point Pa and the corresponding reference point Pr are set substantially in alignment with each other along the horizontal direction and, as a result, an edge line extending along the vertical direction in real space can be detected with better reliability.

In step S605, the edge line detection unit 713 calculates luminance differences each representing the difference between the luminance value at a subject point Pa and the luminance value at the corresponding reference point Pr assuming matching heights in real space.

In step S606, the edge line detection unit 713 calculates the attribute s of each subject point Pa as expressed in (1) described earlier.

In step S607, the edge line detection unit 713 calculates values each representing the continuity c of the attribute s in correspondence to one of the subject points Pa as expressed in (2).

In step S608, the edge line detection unit 713 makes a decision, as expressed in (3), as to whether or not the value obtained by normalizing the total sum of the values representing the continuity c is greater than the threshold value θ. If the edge line detection unit 713 judges that the normalized value is greater than the threshold value θ (S608: YES), the operation proceeds to execute the processing in step S609. In step S609, the edge line detection unit 713 detects the particular subject line La as an edge line, before the operation proceeds to execute the processing in step S610. If, on the other hand, the edge line detection unit 713 judges that the normalized value is not greater than the threshold value θ (S608: NO), the operation proceeds to execute the processing in step S610 without detecting the subject line La as an edge line. The threshold value θ may be set by the second BSW control unit 65.

In step S610, the second vehicle detection unit 71 makes a decision as to whether or not the processing in step S601 through step S609 has been executed for all the subject lines La that can be set on the detection area A3. If the second vehicle detection unit 71 judges that the processing has not been executed for all the subject lines La (S610: NO), the operation proceeds to execute the processing in step S601 to set a new subject line La and repeatedly executes the processing up to step S610 in correspondence to the new subject line La. If, on the other hand, the second vehicle detection unit 71 determines that the processing has been executed for all the subject lines La (S610: YES), the operation proceeds to execute the processing in step S611 in FIG. 28.

In step S611 in FIG. 28, the second three-dimensional object detection unit 714 calculates, as expressed in any of (expression 4), (expression 5) and (expression 6), the extent of change occurring in the luminance along each edge line detected through step S609 in FIG. 27.

In step S612, the second three-dimensional object detection unit 714 excludes any edge line manifesting a luminance change to an extent greater than a predetermined threshold value, among the edge lines for which the extents of luminance change have been calculated in step S611. Namely, any edge line manifesting a great extent of luminance change is judged to be not a proper edge line, and such an edge line is not used in the three-dimensional object detection. Through these measures, characters painted on the road surface, grass on the shoulder of the road and the like in the detection area A3 are not erroneously detected as edge lines. Accordingly, a value determined in advance through testing or the like based upon luminance changes attributable to characters on the road surface, grass on the shoulder of the road and the like is set as the predetermined threshold value.

In step S613, the second three-dimensional object detection unit 714 makes a decision as to whether or not the quantity of edge lines is equal to or greater than a second threshold value $\beta$. It is to be noted that the second threshold value $\theta$ may be set at a value determined in advance through testing or the like or it may be set by the second BSW control unit 65. For instance, in conjunction with four-wheel vehicles set as detection target three-dimensional objects, the second BSW control unit 65 may set the second threshold value $\beta$ based upon the number of edge lines belonging to a four-wheel vehicle, which appear in the detection area A3, ascertained in advance through testing or the like. Upon deciding that the quantity of edge lines is equal to or greater than the second threshold value $\beta$ (S613: YES), the second three-dimensional object detection unit 714 proceeds to execute the processing in step S614. If, on the other hand, the second three-dimensional object detection unit 714 decides that the quantity of edge lines is not equal to or greater than the second threshold value $\beta$ (S613: NO), it judges that no three-dimensional object is present in the detection area A3 and the processing in FIG. 28 ends. In step S614, the second three-dimensional object detection unit 714 detects the three-dimensional object present in the detection area A3, before ending the processing in FIG. 28. The three-dimensional object thus detected may be judged to be another vehicle VX traveling in the lane immediately next to the lane in which the subject vehicle V is traveling, or a decision may be made by taking into consideration the speed of the detected three-dimensional object relative to the subject vehicle V as to whether or not the detected three-dimensional object is another vehicle VX traveling in the adjacent lane.

(Second Sun Decision Unit 64)

The photographic image information for a photographic image obtained by the image acquisition unit 31 is input to the second sun decision unit 64 in FIG. 22. The second sun decision unit 64 detects a high luminance area attributable to sunlight reflected at the road surface in the photographic image, estimates the position of the sun based upon the range of the detected high luminance area and makes a decision as to whether or not direct sunlight enters the photographic field.

Figure 29:
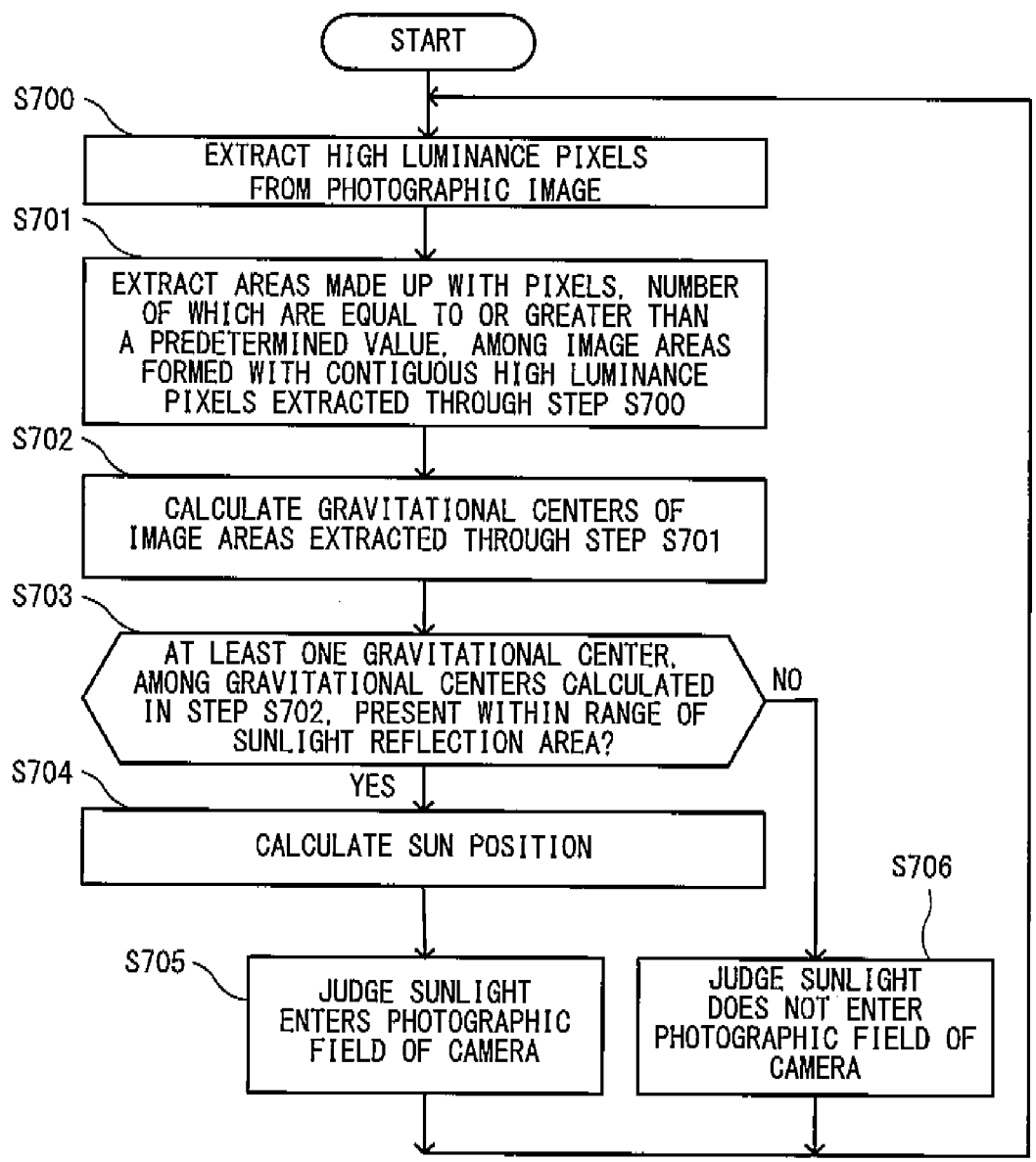

FIG. 29 presents a flowchart pertaining to the second sun decision unit 64. In step S700, the control unit 7 extracts pixels indicating high luminance (e.g., with luminance values equal to or greater than 190 in the 256 gradation range) from the photographic image input from the image acquisition unit 31. In step S701, the control unit 7 extracts any image area made up with pixels, the number of which is equal to or greater than a predetermined value, among pixel clusters (image areas) formed with contiguous pixels extracted in step S700.

In step S702, the control unit 7 calculates the gravitational centers of the image areas extracted in step S701. In step S703, the control unit 7 makes a decision as to whether or not at least one of the gravitational centers calculated in step S702 is within the range of the sunlight reflection area. Upon making an affirmative decision in step S703, the control unit 7 proceeds to execute the processing in step S704, whereas upon making a negative decision in step S703, it proceeds to execute the processing in step S705.

In step S704, the control unit 7 calculates the position of the sun based upon the position of the gravitational center of the high luminance area which has been calculated in step S702 and is present within the range of the sunlight reflection area.

Figure 30:
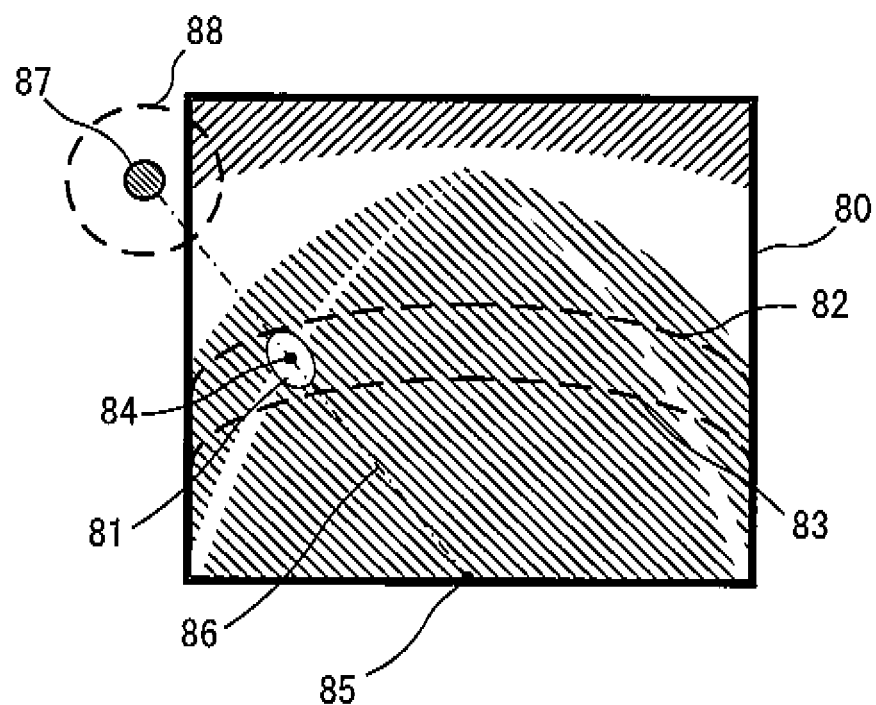

In reference to FIG. 30, the method of sun position calculation will be described. FIG. 30 shows a photographic image 80 that includes a high luminance area 81. An upper limit line 82 and a lower limit line 83, indicated by dotted lines, define the sunlight reflection area in the photographic image 80. A gravitational center 84 of the high luminance area 81 is inside the sunlight reflection area in the example presented in FIG. 30. The control unit 7 calculates the solar azimuth based upon the direction of a line segment 86 connecting the gravitational center 84 and a middle point 85 of the lower side of the photographic image 80. It also calculates the solar elevation based upon the position of the gravitational center 84 taken along the direction running toward the top/bottom of the photographic image 80.

When the gravitational center 84 is present within the sunlight reflection area, at least part of a sun range centered on a solar position 87 overlaps the photographic image 80. In other words, sunlight radiating from the sun assuming the position 87 enters the photographic field of the camera 1. It is to be noted that when the gravitational center 84 takes a higher position along the direction running toward the top/bottom of the photographic image 80, the solar elevation is calculated to be lower.

In step S705 in FIG. 29, the control unit 7 judges that sunlight enters the photographic field of the camera 1. In step S706, the control unit 7 judges that no sunlight enters the photographic field of the camera 1. In other words, it judges that the sun range does not overlap the photographic image.

(Second BSW Control Unit 65)

The second BSW control unit 65 in FIG. 22 controls the second BSW unit 62 by setting the threshold value $\theta$ based upon the photographic image input thereto from the image acquisition unit 31, the detection results provided by the opacity detection unit 33 and the decision-making results provided by the second sun decision unit 64.

Figure 31:
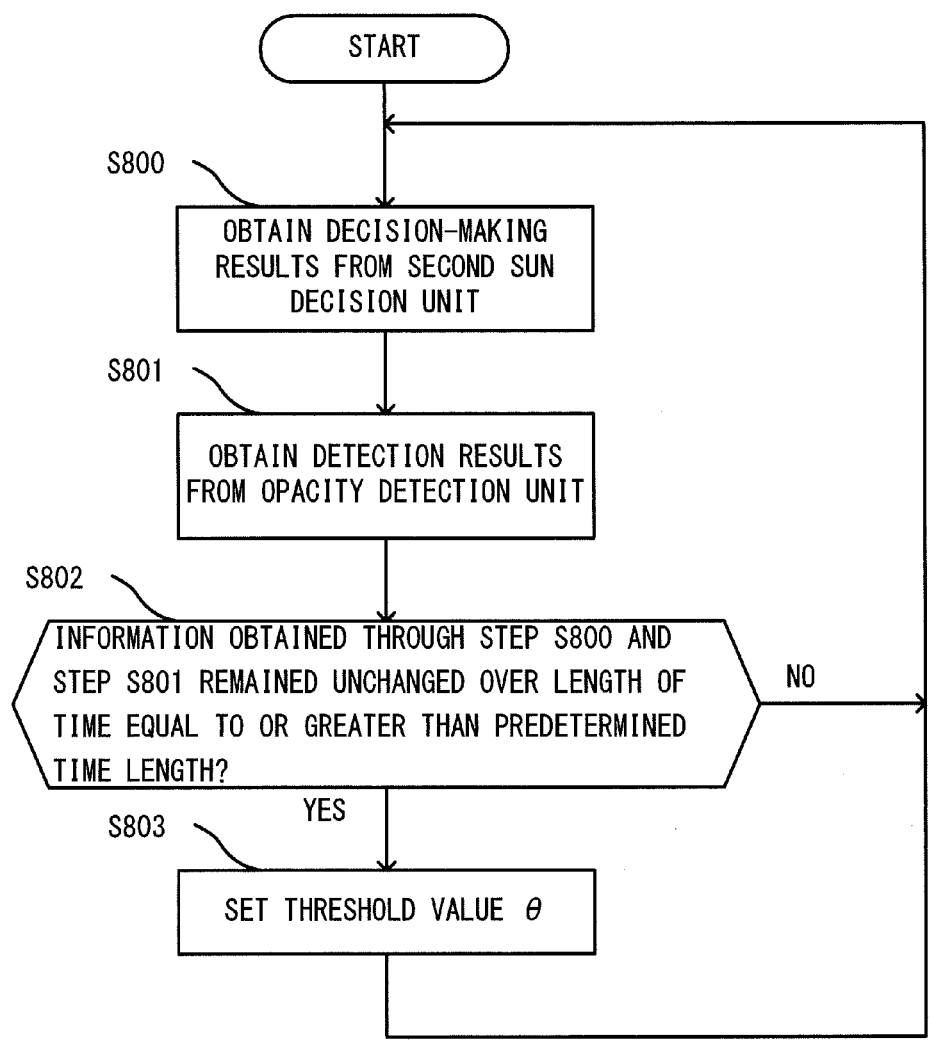

FIG. 31 presents a flowchart of the processing pertaining to the second BSW control unit 65. In step S800, the control unit 7 obtains the decision-making results provided by the second sun decision unit 64. Namely, information pertaining to the decision made in step S705 or step S706 in FIG. 29 is obtained. In step S801, the control unit 7 obtains the detection results provided by the opacity detection unit 33. More specifically, it obtains information pertaining to the decision made in step S306 or step S307 in FIG. 14 from the opacity detection unit 33.

In step S802, the control unit 7 makes a decision as to whether or not the information obtained in step S800 and step S801 has remained unchanged continuously over a length of time equal to or greater than a predetermined time length. If an affirmative decision is made in step S802, the control unit 7 proceeds to execute the processing in step S803 in FIG. 31, whereas if a negative decision is made in step S802, it proceeds to execute the processing in step S800 in FIG. 31.

In step S803, the control unit 7 sets the threshold value θ for the second BSW unit 62 based upon the table shown in FIG. 32, and subsequently it proceeds to execute the processing in step S800 in FIG. 31.

FIG. 32 presents an example of a value setting table pertaining to the threshold value θ set by the second BSW control unit 65. The value setting table in FIG. 32 may be stored in the storage unit 6 as a lookup table. In such a case, the second BSW control unit 65 sets the threshold value θ by referencing the lookup table stored in the storage unit 6 based upon the detection results provided by the opacity detection unit 33 and the decision-making results provided by the second sun decision unit 64.

The control is executed on the premise that sunlight is reflected off the road surface, since the second sun decision unit 64 estimates the position of the sun based upon a high luminance area attributable to road surface reflection. For this reason, the lookup table in FIG. 32 does not include the road surface reflection parameter. In addition, each threshold value θ is indicated as a specific level in FIG. 32. The actual threshold value θ takes on a value rather than a level, and a larger value is set for the threshold value θ as the corresponding level becomes higher with the greatest value selected for the threshold value θ at level 10. The value settings for the threshold value θ corresponding to the various levels are determined in advance in the design stage of the onboard vehicle recognition device 200. It is to be noted that the table in FIG. 32 simply represents an example and the highest level does not need to be level 10.

The second BSW control unit 65 sets the threshold value θ to level 10 (highest level) under condition No. 12 in FIG. 32. When sunlight enters the photographic field of the camera 1, the contrast becomes lowered over the entire photographic image captured with the camera 1. In addition, when the photographic lens in the camera 1 is clouded, the contrast is further lowered over the entire photographic image captured with the camera 1. Under these circumstances, the accuracy with which the second BSW unit 62 detects another vehicle and the like may be compromised. The second BSW control unit 65 suspends notification by the second BSW unit 62 under such conditions so as to prevent erroneous detection of another vehicle and ultimately sustains the accuracy of the image recognition processing at a required level.

In addition, the second BSW control unit 65 sets the threshold value θ to a lower level under a condition No. 10, relative to the level selected under the condition No. 9. The second BSW control unit 65 also sets the threshold value θ to a lower level under a condition No. 11, relative to the level selected under a condition No. 9. Namely, if direct sunlight or clouding of the photographic lens is the only contributing factor in lowering the contrast in the overall photographic image captured with the camera 1, the second BSW control unit 65 selects a lower value for the threshold value θ so as to ensure that a lowered peak in the differential waveform, caused by the lowered contrast, can still be detected by raising the sensitivity for another vehicle detection and ultimately ensure that another car can be detected with a high level of accuracy.

(Additional Notes on the Opacity Detection Unit 33)

The detection areas A3 and A4 are set by the second three-dimensional object detection unit 714 at positions substantially matching those of the detection areas A1 and A2 set by the three-dimensional object detection unit 413 in the first embodiment. This means that detection of clouding of the lens surface at least over an area corresponding to the detection area A1 or A2, executed by the opacity detection unit 33, is substantially the same as detection of clouding at a lens surface at least over an area corresponding to the detection area A3 or A4, executed by the opacity detection unit 33. Namely, the opacity detection unit 33 is capable of detecting clouding of the lens surface at least over an area corresponding to the detection area A3 or A4.

(Additional Notes on the Notification Control Unit 42)

The notification control unit 42 executes the processing in the flowchart presented in FIG. 20 in the second embodiment as well. The notification control unit 42 executing the processing in step S1000 in FIG. 20 in the second embodiment makes a decision as to whether or not the BSW function is suspended by the second BSW control unit 65 by making a decision as to whether or not the threshold value θ is set at level 10 (highest value).

The following advantages are achieved through the second embodiment described above.

The control unit 7 in the onboard vehicle recognition device 200 includes the image acquisition unit 31, the second sun decision unit 64, the opacity detection unit 33, the second vehicle detection unit 71 and the second BSW control unit 65.

The image acquisition unit 31 obtains a photographic image of an area outside the vehicle captured and output by the camera 1.

The second sun decision unit 64 calculates, at least, the solar elevation based upon the position of the gravitational center of the high luminance area 81 (step S704 in FIG. 29) and makes a decision as to whether or not the position of the gravitational center 84 of the high luminance area 81 is present within the sunlight reflection area. The sunlight reflection area is defined by an upper limit line 82 and a lower limit line 83, and when the gravitational center 84 is located above the lower limit line 83, the elevation of the sun is equal to or lower than a predetermined elevation.

The opacity detection unit 33 detects clouding of the lens surface of the photographic lens in the camera 1 at least over areas corresponding to the detection area A3 and the detection area A4 (see additional notes on the opacity detection unit 33).

The second vehicle detection unit 71 detects another vehicle from an image area in the photographic image corresponding to the detection area A3 or A4 (step S614 in FIG. 28).

If the opacity detection unit 33 detects clouding of the lens surface at least over an area corresponding to the detection area A3 or A4 and the second sun decision unit 64 decides that the solar elevation is equal to or lower than the predetermined elevation, the second BSW control unit 65 at least adjusts the threshold value θ to the highest level so as to suspend detection of another vehicle by the second vehicle detection unit 71 (step S803 in FIG. 31, No. 12 in FIG. 32).

The on-board vehicle recognition device 200 adopting these measures assures high accuracy in image recognition processing even when sunlight enters the photographic image.

The embodiments described above allow for the following variations.

(Variation 1) Combining the Embodiments

Either the control unit 2 or the control unit 7 may include both the BSW unit 32 and the second BSW unit 62. In such a case, if another vehicle VX is detected by both the three-dimensional object detection unit 413 and the second three-dimensional object detection unit 714, the control unit may judge that another vehicle VX has been detected. In addition, such a control unit may include both the BSW control unit 35 and the second BSW control unit 65, or it may set both the first threshold value α and the threshold value θ by using either the BSW control unit 35 or the second BSW control unit 65. When the threshold value θ is set by the BSW control unit 35, the level settings for the first threshold value α shown in FIG. 17 should be regarded as the level settings for the threshold value θ. Likewise, when the first threshold value α is set by the second BSW control unit 65, the level settings for the threshold value θ in FIG. 32 should be regarded as the level settings for the first threshold value a.

The control unit 2 may include the second BSW unit 62 instead of the BSW unit 32. In this case, the control unit 2 will include the second sun decision unit 64 instead of the sun decision unit 34, and the BSW control unit 35 will set the threshold value θ rather than the first threshold value a. When the threshold value θ is set by the BSW control unit 35, the level settings for the first threshold value α in FIG. 17 should be regarded as the level settings for the threshold value θ.

The control unit 7 may include the BSW unit 32 instead of the second BSW unit 62. In this case, the control unit 7 will include the sun decision unit 34 instead of the second sun decision unit 64, and the second BSW control unit 65 will set the first threshold value α rather than the threshold value θ. When the first threshold value α is set by the second BSW control unit 65, the level settings for the threshold value θ in FIG. 32 should be regarded as the level settings for the first threshold value a.

The BSW control unit 35 and the second BSW control unit 65 may set a threshold value other than the first threshold value α and the threshold value θ. For instance, they may set the second threshold value β, which is used in step S613 in FIG. 28. In addition, they may set the threshold values ε1, ε2 and ε3 for the opacity detection unit 33. When the BSW control unit 35 sets a threshold value other than the first threshold value α, the level settings for the first threshold value α in FIG. 17 should be regarded as the level settings for the other threshold value. Likewise, when the second BSW control unit 65 sets a threshold value other than the threshold value θ, the level settings for the threshold value θ in FIG. 32 should be regarded as the level settings for the other threshold value.

Either the control unit 2 or the control unit 7 may include both the sun decision unit 34 and the second sun decision unit 64.

The structural features of the first embodiment and the structural features of the second embodiment may be adopted in any other mode of combination as long as the essential characteristics of the present invention remain intact.

(Variation 2) Adjusting the Threshold Value in Correspondence to the Degree of Opacity While the threshold value is adjusted based upon whether or not clouding is detected by the opacity detection unit 33 in the embodiments described above, the degree of opacity in the photographic lens of the camera 1 may be quantized and the threshold value may be adjusted based upon the numerical value representing the degree of opacity. The degree of opacity may be calculated based upon, for instance, the average value E1 of the histogram H1, the average value E2 of the histogram H2 and the average value E3 of the histogram H3.

Figure 33:
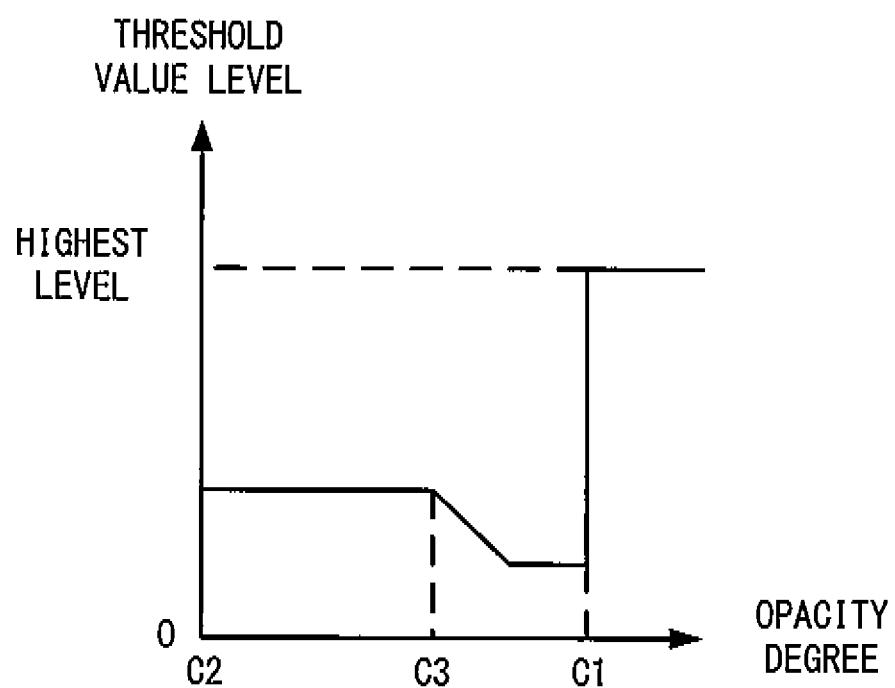

FIG. 33 presents a schematic chart indicating a relationship between the degree of opacity and the threshold value that may be assumed when the sun decision unit 34 judges that sunlight is entering the photographic field of the camera 1. The level of the threshold value, such as the first threshold value a, is indicated along the vertical axis in FIG. 33, whereas the degree of opacity is indicated along the horizontal axis in FIG. 33. When the opacity degree is C2, there is no clouding in the photographic lens of the camera 1. An opacity degree equal to or greater than C1 corresponds to the condition No. 8 in FIG. 17, under which the threshold value is set to the highest level by the BSW control unit 35 or the like. When the opacity degree is equal to or greater than C3 and equal to or lower than C1, the threshold value is set lower than that set when the opacity degree is equal to C2 or that set when the opacity degree is equal to C1. Through these measures, the utmost effort is made to sustain a desirable level of detection accuracy for the detection of another vehicle VX at least until the opacity detection unit 33 judges that the lens surface is clouded at least over an area corresponding to the detection area A1 or A2.

(Variation 3) Opacity Detection Over the Sun Range

When there is opacity within the sun range, the BSW control unit 35 may set the threshold value to a higher level. Likewise, when there is opacity within the sun range, the second BSW control unit 65 may set the threshold value to a higher level. A decision as to whether or not opacity manifests over the sun range may be made based upon a luminance gradient within the sun range. Light passing through a clouded area of the lens surface of the photographic lens in the camera 1 is diffused via the accumulated matter causing the clouding, and for this reason, the difference in luminance from one pixel to another over an image area corresponding to the clouded area is bound to be small, resulting in a small luminance gradient. Accordingly, when the luminance gradient is equal to or less than a predetermined value, the BSW control unit 35 or the second BSW control unit 65 may decide that opacity manifests over the sun range.

The embodiments and the variations thereof described above simply represent examples and the present invention is in no way limited to their particulars, as long as the features characterizing the present invention remain intact. In addition, the embodiments and the variations thereof described above may be adopted in any conceivable combination as long as the features characterizing the present invention remain intact.

The disclosure of the following priority application is herein incorporated by reference:
Japanese Patent Application No. 2012-167602 filed Jul. 27, 2012

EXPLANATION OF REFERENCE NUMERALS 1 camera
2 control unit
3 warning output unit
4 operating state reporting unit
5 external device control unit
6 storage unit
7 control unit
31 image acquisition unit
32 BSW unit
33 opacity detection unit
34 sun decision unit
35 BSW control unit
41 vehicle detection unit
42 notification control unit
51 opacity detection area
52 opacity detection area
53 opacity detection area
61 sun range
62 second BSW unit
64 second sun decision unit
65 second BSW control unit
71 second vehicle detection unit
81 high luminance area
82 upper limit line
83 lower limit line
84 gravitational center
88 sun range
100 onboard vehicle recognition device
200 onboard vehicle recognition device
411 point-of-view conversion unit
412 alignment unit
413 three-dimensional object detection unit
712 luminance difference calculation unit
713 edge line detection unit
714 second three-dimensional object detection unit

The invention claimed is:

1. An image processing device, comprising:
a memory; and
a controller including a processor that executes a program stored in the memory to obtain a photographic image of an area outside of a first vehicle captured and output by a camera;
calculate a sun position which indicates, at least, a solar elevation and makes a decision as to whether or not the solar elevation is equal to or lower than a predetermined elevation;
detect clouding of a lens surface of the camera;
detect a second vehicle, different from the first vehicle, based upon image information of a first image area in the photographic image; and
suspend detection of the second vehicle if opacity is detected in, at least, the first image area and it is decided that the solar elevation is equal to or lower than the predetermined elevation.

2. The image processing device according to claim 1, wherein:
the controller has a predetermined threshold value pertaining to detection sensitivity with which the second vehicle is detected; and
if clouding manifests at the lens surface over an area corresponding to an image area centered on the sun position, the controller adjusts the threshold value so as to lower the detection sensitivity for detection of the second vehicle relative to the detection sensitivity set when no clouding manifests over said area at the lens surface.

3. The image processing device according to claim 1, wherein:
the controller calculates the sun position based upon date and time, a latitude and a longitude of a position taken by the first vehicle, and an orientation of the first vehicle.

4. The image processing device according to claim 1, wherein:
the controller calculates the sun position by executing image processing on the photographic image.

5. The image processing device according to claim 4, wherein:
the camera captures an image of at least a road surface outside the first vehicle; and
the controller extracts a high luminance area formed due to road surface reflection from the photographic image and calculates the sun position based upon a position of a gravitational center of the high luminance area.

6. The image processing device according to claim 2, wherein:
the controller detects clouding at the lens surface over the area corresponding to the image area centered on the sun position based upon a luminance gradient in said image area.

7. The image processing device according to claim 1, wherein:
an opacity detection area, which is affected by clouding of the lens surface, is set in the photographic image; and
the controller calculates a histogram of edge intensity for the opacity detection area and detects an area where clouding manifests at the camera lens based upon an average value of the edge intensity calculated by using the histogram.

8. The image processing device according to claim 7, wherein:
the camera captures an image of at least a road surface outside the first vehicle;
a plurality of opacity detection areas, which are affected by clouding of the lens surface, are set near a vanishing point of a white line painted on the road surface; and
the controller calculates histograms of edge intensity, each in correspondence to one of the opacity detection areas, and detects an area where clouding manifests at the camera lens based upon average values of the edge intensity each calculated by using one of the histograms.

9. The image processing device according to claim 7, wherein:
the camera captures an image of at least a road surface outside the first vehicle;
the opacity detection area includes a first opacity detection area set near a vanishing point of a white line painted on the road surface at a position further upward relative to a center of the photographic image and a second opacity detection area set near the vanishing point so as to range further downward relative to the first opacity detection area; and
the controller detects an area where clouding manifests at the camera lens by using the first opacity detection area during daytime and detects an area where clouding manifests at the camera lens by using the second opacity detection area during nighttime.

10. The image processing device according to claim 1, wherein:
the controller reports that detection of the second vehicle has been suspended.

11. The image processing device according to claim 2, wherein:
the controller detects clouding at the lens surface of the camera when a degree of opacity at the lens surface of the camera exceeds a first opacity degree;
the controller sets the threshold value to a first threshold value when the degree of opacity at the lens surface of the camera is a second opacity degree at which no clouding manifests at the lens surface;
the controller sets the threshold value to a second threshold value greater than the first threshold value when the degree of opacity at the lens surface of the camera exceeds the first opacity degree; and
the controller sets a third opacity degree, in correspondence to which the threshold value is set to a third threshold value smaller than both the first threshold value and the second threshold value, between the second opacity degree and the first opacity degree.

* * * * *